US011989026B1

(12) United States Patent
Wang et al.

(10) Patent No.: US 11,989,026 B1
(45) Date of Patent: May 21, 2024

(54) SPEED CONTROL SYSTEM FOR AN AUTONOMOUS MOBILE DEVICE

(71) Applicant: AMAZON TECHNOLOGIES, INC., Seattle, WA (US)

(72) Inventors: Chen Wang, Fremont, CA (US); Lei Zhu, Milpitas, CA (US); Miro Yakov Shverdin, Mountain View, CA (US); Yue Hu, San Francisco, CA (US); Isabella Talley Lewis, San Jose, CA (US); Bruce Robert Woodley, Palo Alto, CA (US); Daimian Wang, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 393 days.

(21) Appl. No.: 17/303,044

(22) Filed: May 19, 2021

(51) Int. Cl.
G05D 1/02 (2020.01)
G01S 17/42 (2006.01)
G01S 17/58 (2006.01)
G01S 17/86 (2020.01)
G05D 1/00 (2006.01)

(52) U.S. Cl.
CPC ............ *G05D 1/0223* (2013.01); *G01S 17/42* (2013.01); *G01S 17/58* (2013.01); *G01S 17/86* (2020.01); *G05D 1/027* (2013.01)

(58) Field of Classification Search
CPC ...... G05D 1/0223; G05D 1/027; G01S 17/42; G01S 17/58; G01S 17/86
USPC ... 701/23, 26, 25, 1, 93, 110, 507, 300, 119, 701/7, 79, 121, 33.1, 44, 422, 30.5, 30.9
See application file for complete search history.

(56) References Cited

U.S. PATENT DOCUMENTS

| 2019/0094874 A1* | 3/2019 | Ogawa | G05D 1/0246 |
| 2019/0302793 A1* | 10/2019 | Leech | G05D 1/0242 |
| 2020/0172183 A1* | 6/2020 | Blankespoor | B62D 57/032 |

OTHER PUBLICATIONS

"OPT3101", Texas Instruments, 4 pages, Texas Instruments 2021. Retrieved from the Internet: URL: https://www.ti.com/product/OPT3101.
"TMF8801 1D Time-of-Flight Sensor", AMS AG, 3 pages. Retrieved from the Internet: URL: https://ams.com/tmf8801.
"UML state machine", Wikipedia, 6 pages. Retrieved from the Internet: URL: https://en.wikipedia.org/wiki/UML_state_machine on Apr. 20, 2021.

* cited by examiner

*Primary Examiner* — Anne Marie Antonucci
*Assistant Examiner* — Jodi Marie Jones
(74) *Attorney, Agent, or Firm* — Landauer Law, PLLC

(57) ABSTRACT

An autonomous mobile device (AMD) may perform tasks within a physical space. The AMD may move over ramps, bumps, or navigate around obstacles. The AMD may have an inertial measurement unit (IMU) and distance sensors. The IMU provides tilt information indicative of the AMD being on a flat surface or a ramp. The distance sensors provide information on distances between the AMD and surrounding obstacles. Using IMU measurements, the AMD determines a first speed limit that is safe given the tilt of the AMD. Using the distance sensors, the AMD determines a second speed limit that is safe given a distance to an obstacle. The AMD determines a maximum speed based on the first and second speed limits. Based on the maximum speed, the AMD determines whether to adjust a current speed and by how much.

20 Claims, 8 Drawing Sheets

SPEED CONTROL SYSTEM FOR AN AUTONOMOUS MOBILE DEVICE

BACKGROUND

Every day, a user faces a variety of tasks both personal and work-related that need to be attended to. These may include helping in the care of others such as children or the elderly, taking care of a home, staying in contact with others, and so forth. Devices that assist in these tasks may help the user perform the tasks better or may allow the user to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
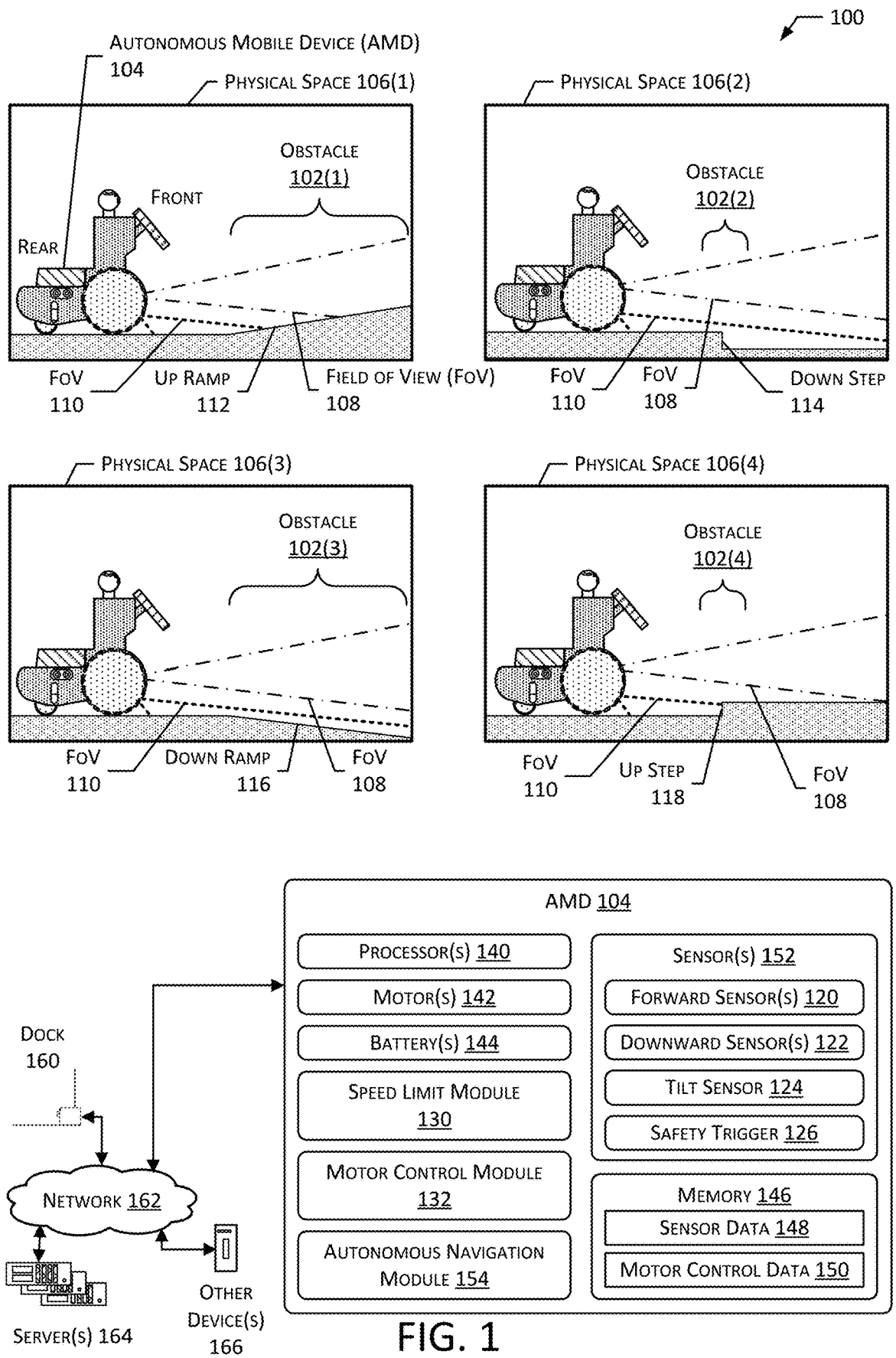
FIG. 1 illustrates a speed control system for an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is a robot capable of autonomous movement from one location in a physical space to another location without being controlled by a user. The AMD may perform tasks that involve displaying information, accepting input, acquiring sensor data, and so forth. A user may interact with the AMD. The AMD moves in the physical space. The front of the AMD may include a display and a camera that may pan and tilt.

As the AMD navigates through a physical space, the AMD may encounter various types of obstacles or objects that may affect a navigation path. An obstacle may be a characteristic of a physical space that may impede or affect movement of the AMD. For example, in a residential environment, a physical space may include obstacles such as thresholds, ramps, steps, thresholds between different types of flooring, or other types of characteristics that affect or impede how the AMD moves. Depending on a type of obstacle, proximity of an obstacle, or characteristics of the obstacle, the AMD 104 may speed up, slow down, or stop in order to safely navigate over or around the obstacle.

A speed control system is described that uses measurements from different sensors to determine a safe operating speed for the AMD based upon obstacles within a physical space. The different sensors may be located at different locations on the AMD, allowing for a wide range of fields of view around the AMD. The AMD may use the sensor measurements to determine one of multiple operating states. Each operating state may correspond to a different speed or to a different range of speeds. For example, an AMD may have four operating states: normal, caution, slow, and stop. In this example, a normal state may be associated with a first speed, a caution state may be associated with a second speed, a slow state may be associated with a third speed, and a stop state may be associated with a fourth speed. The first speed may be faster than the third speed, the third speed may be faster than the second speed, and the second speed may be faster than the first speed. A stop state is associated with the AMD not moving or with a speed of zero meters per second.

By using different sensors, and in some examples, different types of sensors, the AMD may overcome individual sensor limitations to determine a safe operating speed more accurately. Another advantage is that because sensor data from multiple sensors is used, there is a higher confidence that any obstacles within a physical space are more accurately characterized. The AMD may also provide a more pleasant experience to users by avoiding erratic or surprise changes in speed. For example, the AMD may change from a normal operating state to a caution operating state, to a slow operating state before stopping, thereby transitioning between speeds in a controlled and consistent manner. In other examples, the AMD may transition between any state and a stop state in response to an immediate obstacle that may result in the AMD operating unsafely.

A normal state may be associated with a portion of a physical space without obstacles, with obstacles having a first set of characteristics, or with sensor measurements of ambient light or a floor albedo. In the normal state, the AMD may operate at a speed that is determined to be safe for the physical space. An obstacle may be any characteristic of a physical space or any object that is located within the physical space that may impede or affect movement of the AMD. For example, an obstacle may be a stationary object, a moving object, an up ramp, a down ramp, an up step, a down step, or another characteristic of a physical space with a change in elevation or slope. The AMD may continue to operate in a normal state for obstacles such as: up ramps with slopes less than a first threshold, down ramps with slopes less than a second threshold, up steps with a change in elevation over a first distance less than a third threshold, or down steps with a change in elevation over a second distance less than a fourth threshold.

A caution state may be associated with a range of speed values determined to be safe for obstacles having a second set of characteristics or with sensor measurements indicating ambient light levels or an albedo for a surface. For example, if ambient light levels of a physical space are below a threshold level, the accuracy of a time-of-flight forward sensor may be reduced. Based on a reduced accuracy, the AMD may transition to a caution operating state. A slow state may be associated with a range of speed values determined to be safe for obstacles having a third set of characteristics or with sensor measurements indicating ambient light levels or an albedo for a surface. A stop state may be associated with a range of speed values determined to be safe for obstacles having a fourth set of characteristics or with sensor measurements indicating ambient light levels or an albedo for a surface. For example, if an albedo of a floor in front of the AMD is too dark, the accuracy of a time-of-flight downward sensor may be reduced. Based on the reduced accuracy, the AMD may transition to a stop operating state.

The AMD includes a speed limit module that uses sensor measurements from multiple sensors and determines an operating state for the AMD. The AMD includes a motor control module that uses the operating state to determine an operating speed. The multiple sensors may include a tilt sensor, downward sensors, and forward sensors. A tilt sensor may be an inertial measurement unit. A downward sensor may be a time-of-flight sensor with a field of view (FoV) that includes an area of a floor in front of the AMD. A forward sensor may be a time-of-flight sensor with a field of view that includes an area in front of the AMD up to a distance limited by the time-of-flight sensor.

The sensor measurements from each sensor may be used by an individual state logic module for an individual type of sensor. The individual state logic module for an individual type of sensor uses the sensor data to determine an operating state for the AMD. For example, if there are P forward sensors, the forward sensor state logic module determines P operating states based on the sensor data from the P forward sensors. Similarly, if there are Q downward sensors, the downward sensor state logic module determines Q operating states based on the sensor data from the Q downward sensors. Similarly, if there are R tilt sensors, the tilt sensor state logic module determines R operating states based on the sensor data from the R tilt sensors. Continuing with this example, the (P+Q+R) operating states are used by the speed limit module to determine an operating state for the AMD. In one example, the speed limit module may determine an operating state for the AMD to be an operating state associated with a lowest range of speeds.

For different sensors, a speed limit module may use a logic module associated with a given sensor to determine an operating state using sensor data from the different sensors. For example, a tilt sensor state logic module may use sensor data from a tilt sensor to determine an operating state. A downward sensor logic module may use sensor data from a downward sensor. A forward sensor logic module may use sensor data from a forward sensor state. The individual state logic module for each different sensor allows the AMD to determine an appropriate operating state in response to characteristics about obstacles determined by an individual sensor.

Tilt sensor data may be used by a tilt sensor state logic module to determine an operating state based on whether the AMD is tilted beyond a tilt threshold. The tilt sensor state logic module may determine a running mean over a period of time or over a number of tilt measurements. The running mean may be used to determine whether the sensor data is indicative of a tilt of the AMD is greater than the slope threshold.

Forward sensor data may be used by a forward sensor state logic module to determine an operating state based on whether the sensor data is indicative of brightness levels above a brightness threshold or whether an obstacle is closer than a first distance threshold. For example, the forward sensor state logic module may determine a slow operating state based on brightness levels for an ambient environment being above a first brightness threshold. The forward sensor state logic module may also determine a caution operating state based on brightness levels for the ambient environment being below the first brightness threshold but above a second brightness threshold. The forward sensor state logic module may also determine a stop operating state based on an obstacle being closer than the first distance threshold.

Downward sensor data may be used by a downward sensor state logic module to determine an operating state based on whether the sensor data is indicative of brightness levels for a surface above a brightness threshold or based on characteristics of a ramp or step. For example, the downward sensor state logic module may determine a stop operating state based on the albedo of a surface in front of the AMD being below a third brightness threshold or based on a distance of an obstacle being closer than a second distance threshold or farther than a third distance threshold. For example, if a surface in front of the AMD is too dark, then the sensor measurements may be less reliable, and the downward sensor state logic module may determine a stop operating state. Similarly, if an obstacle is closer than a second distance threshold, then the downward sensor state logic module may determine that the obstacle is an up ramp or an up step with a slope that may not be safe to navigate over, and the downward sensor state logic module may determine a stop operating state. Similarly, the downward sensor state logic module may determine a caution operating state, a slow operating state, or a normal operating state based on the albedo of a surface or characteristics of an up ramp, down ramp, up step, or down step.

By using the systems and techniques described in this disclosure, the AMD determines an operating speed that is safe and appropriate for conditions within a physical space. The use of different types of sensors allows the determination of a safe operating speed more accurately. Another advantage is that the AMD may also provide a more pleasant experience to users by avoiding erratic or surprise changes in speed. For example, because the AMD may change from a normal operating state to a caution operating state, to a slow operating state before stopping, the AMD may transition between speeds in a controlled and consistent manner.

Illustrative System

FIG. 1 illustrates a speed control system 100 for an AMD, according to some implementations.

The AMD 104 is depicted within physical spaces 106(1)-(4) that include different types of obstacles 102(1)-(4). The AMD 104 may include one or more forward sensors 120, one or more downward sensors 122, a tilt sensor 124, and a safety trigger 126. The one or more forward sensors 120 may have one or more fields of view 108. The one or more downward sensors 122 may have one or more fields of view 110.

In one implementation, the forward sensors 120 may be time-of-flight sensors. For example, the forward sensors 120 may be implemented by an AMS time-of-flight sensor model TMF8801. In one implementation, the downward sensors 122 may also be time-of-flight sensors. For example, the downward sensors 122 may be implemented by a Texas Instruments time-of-flight sensor model OPT3101. The tilt sensor 124 may comprise an accelerometer, a gimbaled sensor, an inertial measurement unit (IMU), or another type of sensor that measures a tilting position of the AMD 104 with reference to one or more horizontal axes of the AMD 104. The safety trigger 126 may be implemented by an interrupt handler that is triggered when one or more of the forward sensors 120, downward sensors 122, or tilt sensor 124 is unresponsive, malfunctioning, or otherwise operating unreliably. In one implementation, the forward sensors 120 or downward sensors 122 may be ultrasonic sensors or some other type of sensors that may provide measurement data that may be used to determine a distance to a point or to an area around the AMD 104. In some examples, the ultrasonic sensors may be used instead of or in addition to the forward sensors 120. In other examples, the ultrasonic sensors may be used instead of or in addition to the downward sensors 122.

The forward sensors 120 may be located along a front portion of the AMD 104 and may be oriented to provide a field of view 108. For example, the AMD 104 may include four forward sensors, two forward sensors on a left, front portion and two forward sensors on a right, front portion. Of the two forward sensors on the right, front portion, one forward sensor may be directed straight ahead, and one forward sensor may be directed ahead and leftward of the AMD 104. Similarly, of the two forward sensors on the left, front portion, one forward sensor may be directed straight ahead, and one forward sensor may be directed ahead and rightward of the AMD 104. The downward sensors 122 may be located along a front portion of the AMD 104 and may be oriented to provide a field of view 110. For example, the AMD 104 may include three downward sensors. A first downward sensor may be directed downward toward a floor and leftward, a second downward sensor may be directed downward toward the floor ahead of the AMD 104, and a third downward sensor may be directed downward toward the floor and rightward.

In some implementations, a front of the AMD 104 may be the portion of the AMD 104 that first encounters obstacles in a direction in which the AMD 104 is moving. For example, as depicted in FIG. 1, the front of the AMD 104 is the direction in which the fields of view 108, 110 are directed. For example, the AMD 104 may have time-of-flight sensors located on a rear portion of the AMD 104 to provide fields of view behind the AMD 104 similar to the fields of view 108, 110 in front of the AMD 104. In this example, if the AMD 104 moves backward, the sensors on the rear portion of the AMD 104, in addition to the tilt sensor 124 and safety trigger 126, may be used to determine an operating state using the speed control module 130 similarly to how the speed control module uses the forward sensors 120, downward sensors 122, tilt sensor 124, and safety trigger 126 to determine an operating state.

Similarly, a left side of the AMD 104 may have a portion that includes time-of-flight sensors that provide fields of view of the left side similar to the fields of view 108, 110 in front of the AMD 104. In this example, if the AMD 104 moves in a direction in which the left side first encounters obstacles, then the sensors on the left side, in addition to the tilt sensor 124 and safety trigger 126, may be used to determine an operating state using the speed control module 130 similarly to how the speed control module uses the forward sensors 120, downward sensors 122, tilt sensor 124, and safety trigger 126 to determine an operating state. Similarly for a right side of the AMD 104.

The following example continues from the implementation where the AMD 104 may include sensors on different sides of the AMD 104. In this example, the speed control module 130 may use data from one or more of the sensors on one or more of the sides of the AMD 104 to determine a transition between operating states. The speed control module 130 may use sensor data from each side to determine whether an obstacle is near enough or has characteristics to transition to a different operating state. For example, if the AMD 104 moves within an area of a physical space where there is a down step on a first side of the AMD 104, and the down step is used by a sensor logic module to determine a caution state, then the determined caution state may be used by the speed control module 130 along with the sensor logic modules for the forward sensors 120 and downward sensors 122 on the front of the AMD 104.

The AMD 104 may comprise a speed limit module 130 and a motor control module 132. The speed limit module 130 may use data from the forward sensors 120, downward sensors 122, tilt sensor 124, and safety trigger 126 to determine a first operating state. In this implementation, the first operating state may indicate one of multiple operating states, including: normal, caution, slow, or stop. The first operating state may be provided to the motor control module 132. In other implementations, the AMD 104 may have more or fewer operating states. In some examples, the speed limit module 130 may use data from the forward sensors 120 and downward sensors 122, without using a tilt sensor 124, to determine an operating state.

In some implementations, a normal state is associated with a first range of speeds, a caution state is associated with a second range of speeds, a slow state is associated with a third range of speeds, and a stop state is associated with a fourth range of speeds. The first range of speeds may include speeds greater than 0.75 meters per second (m/s) and less than or equal to 1.0 m/s. The second range of speeds may include speeds greater than 0.25 m/s and less than or equal to 0.75 m/s. The third range of speeds may include speeds greater than 0.0 m/s and less than or equal to 0.25 m/s. The fourth range of speeds may include a speed of 0.0 m/s. In other implementations, the range of speeds may be greater or less than the ranges of speeds listed above. In some examples, the first range of speeds may be based on a distance between a floor surface of the AMD 104 and a center of mass of the AMD 104. If the center of mass of the AMD 104 increases, then the first range of speeds may be increased in proportion to the increase of the center of mass of the AMD 104.

The motor control module 132 may determine a speed or speed and acceleration based on the operating state indicated by the first operating state. While in this example, the speed limit module 130 determines an operating state used by the motor control module 132, in other examples, the speed limit module 130 may determine motor control instructions associated with a given operating state. For example, the speed limit module 130 may determine motor control instruction indicating a speed or speed and acceleration. The motor control module 132 may use the operating state or the motor control instructions to operate the AMD 104.

In some implementations, the motor control module 132 may transition between operating states over a period of time. For example, the motor control module 132 may accelerate between operating states at a first acceleration. The motor control module 132 may also decelerate between operating states at a second acceleration. In this example, the first acceleration and the second acceleration may be 1.9 meters per second squared (m/s²). In other examples, the first acceleration and the second acceleration may be specified to be smaller or larger values. In some examples, acceleration between states may be based on a state being transitioned from and a state being transitioned to. For example, if an operating state at a first time is a stop state, and a next operating state is a slow state, then the motor control module 132 may accelerate at a third acceleration. For example, the third acceleration may be 0.38 meters per second squared. Similarly, each state transition may have a same or different acceleration between a first operating state and a second operating state.

In the first physical space 106(1), the AMD 104 is moving toward an obstacle 102(1) that is an up ramp 112. The forward sensors 120 may determine first sensor data indicating one or more distances to one or more physical points on one or more physical surfaces within the field of view 108. The first sensor data may also include a first value indicative of a brightness measurement of the ambient environment of the physical space 106(1). The first value may be measured in lux. If a physical space is too bright, then a time-of-flight sensor may lose accuracy or fail to provide reliable measurements. To compensate for a loss of measurement reliability, brightness levels of an ambient environment may be used to determine an operating state with lower speeds.

The downward sensors 122 may determine second sensor data indicating one or more distances to one or more physical points on one or more physical surfaces within the field of view 110. The second sensor data may indicate a distance that remains relatively constant as the AMD 104 moves over a flat floor. If the floor becomes an up ramp 112, a distance to a surface on the ramp is measured as closer than a distance to a flat surface. Similarly, if the floor becomes a down ramp 116, a distance to a surface on the ramp is measures as farther away than a distance to a flat surface. Distances measured for an up ramp 112 may be used to determine a slope of the up ramp 112. For example, the smaller the distance to the surface of the up ramp 112, the greater the slope of the up ramp 112. Similarly, distances measured for a down ramp 116 may be used to determine a slope of the down ramp 116. For example, the larger the distance to the surface of the down ramp 116, the greater the slope of the down ramp 116. In this example, if the slope of the up ramp 112 is greater than an upward slope threshold, then the downward sensor state logic module may determine a stop state. For example, the upward slope threshold may be 8 degrees, but in other examples, the upward slope threshold may be set higher or lower. Similarly, a downward slope exceeding a downward slope threshold may be used to determine a stop state. The downward slope threshold may be 8 degrees, but in other examples, the downward slope threshold may higher or lower.

In the second physical space 106(2), the AMD 104 is moving toward an obstacle 102(2) that is a down step 114. The downward sensor state logic module may determine a down step 114 based on a decrease in elevation over a first distance that is greater than a down step threshold. For example, an elevation of over 5.5 centimeters (cm) over a first distance of 5.0 cm may be used to determine a down step 114. In other examples, down steps 114 may be specified to be a larger or smaller elevation change over a larger or smaller first distance.

In the third physical space 106(3), the AMD 104 is moving toward an obstacle 102(3) that is a down ramp 116. Similar to determining that an obstacle is an up ramp 112, the AMD 104 may determine that an obstacle 102(3) is a down ramp 116. For example, if the floor becomes a down ramp 116, a distance to a surface on the ramp is measured as farther away than a distance to a flat surface. The larger the distance to the surface of the down ramp 116, the greater the slope of the down ramp 116. In this example, if the slope of the down ramp 116 is greater than a down slope threshold, then the downward sensor state logic module may determine a stop state. For example, the down slope threshold may be 8 degrees, but in other examples, the slope threshold may be set higher or lower.

In the fourth physical space 106(4), the AMD 104 is moving toward an obstacle 102(4) that is an up step 118. The downward sensor state logic module may determine an up step 118 based on an increase in elevation over a second distance that is greater than an up step threshold. For example, an elevation of over 5.5 centimeters (cm) over a second distance of 5.0 cm may be used to determine an up step 118. In other examples, up steps 118 may be specified to be a larger or smaller elevation change over a larger or smaller second distance.

The AMD 104 may include a variety of sensors 152 (described below) that include the forward sensors 120, downward sensors 122, and the tilt sensor 124. The AMD 104 may be configured to dock or connect to a dock 160. The dock 160 may provide external power which the AMD 104 may use to charge a battery 144 of the AMD 104.

The AMD 104 may include battery(s) 144 to provide electrical power for operation of the AMD 104. The battery 144 may be rechargeable, allowing it to store electrical energy obtained from an external source. In other implementations, a wireless power receiver may be used to provide power for operation of the AMD 104, recharge the battery 144, and so forth.

One or more motors 142 or other actuators enable the AMD 104 to move from one location in the physical space 106 to another. For example, a motor 142 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 includes one or more memories 146. The memory 146 may comprise one or more non-transitory computer-readable storage media (CRSM).

The AMD 104 may include one or more sensors 152. For example, the sensors 152 may include microphones, time-of-flight (TOF) sensors cameras, LIDAR, inductive sensors, and so forth. The sensors 152 may generate sensor data 148 and the inductive sensors may generate signal data indicative of measured signal strength. The sensors 152 are discussed in more detail with regard to FIG. 3.

An autonomous navigation module 154 provides the AMD 104 with the ability to navigate within the physical space 106 without real-time human interaction. The autonomous navigation module 154 may implement, or operate in conjunction with, the mapping module 220 to determine one or more of an occupancy map, a navigation map, or other representations of the physical space 106. The AMD 104 may move through the physical space 106. The motion of the AMD 104 may be described as a trajectory. In some implementations the trajectory may include a series of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes. The autonomous navigation module 154 is discussed in more detail with regard to FIG. 2.

The AMD 104 may use the network interfaces 254 to connect to a network 162. For example, the network 162 may comprise a wireless local area network, that in turn is connected to a wide area network such as the Internet.

The dock 160 may also be connected to the network 162. For example, the dock 160 may be configured to connect to the wireless local area network 162 such that the dock 160 and the AMD 104 may communicate.

The AMD 104 may access one or more servers 164 via the network 162. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 164 for further processing. The servers 164 may process the spoken audio and return to the AMD 104 data that may be subsequently used to operate the AMD 104.

The AMD 104 may also communicate with other devices 166. The other devices 166 may include one or more devices that are within the physical space 106 such as a home or associated with operation of one or more devices in the physical space 106. For example, the other devices 166 may include a doorbell camera, a garage door opener, a refrigerator, washing machine, and so forth. In some implementations the other devices 166 may include other AMDs 104, vehicles, and so forth.

Figure 2:
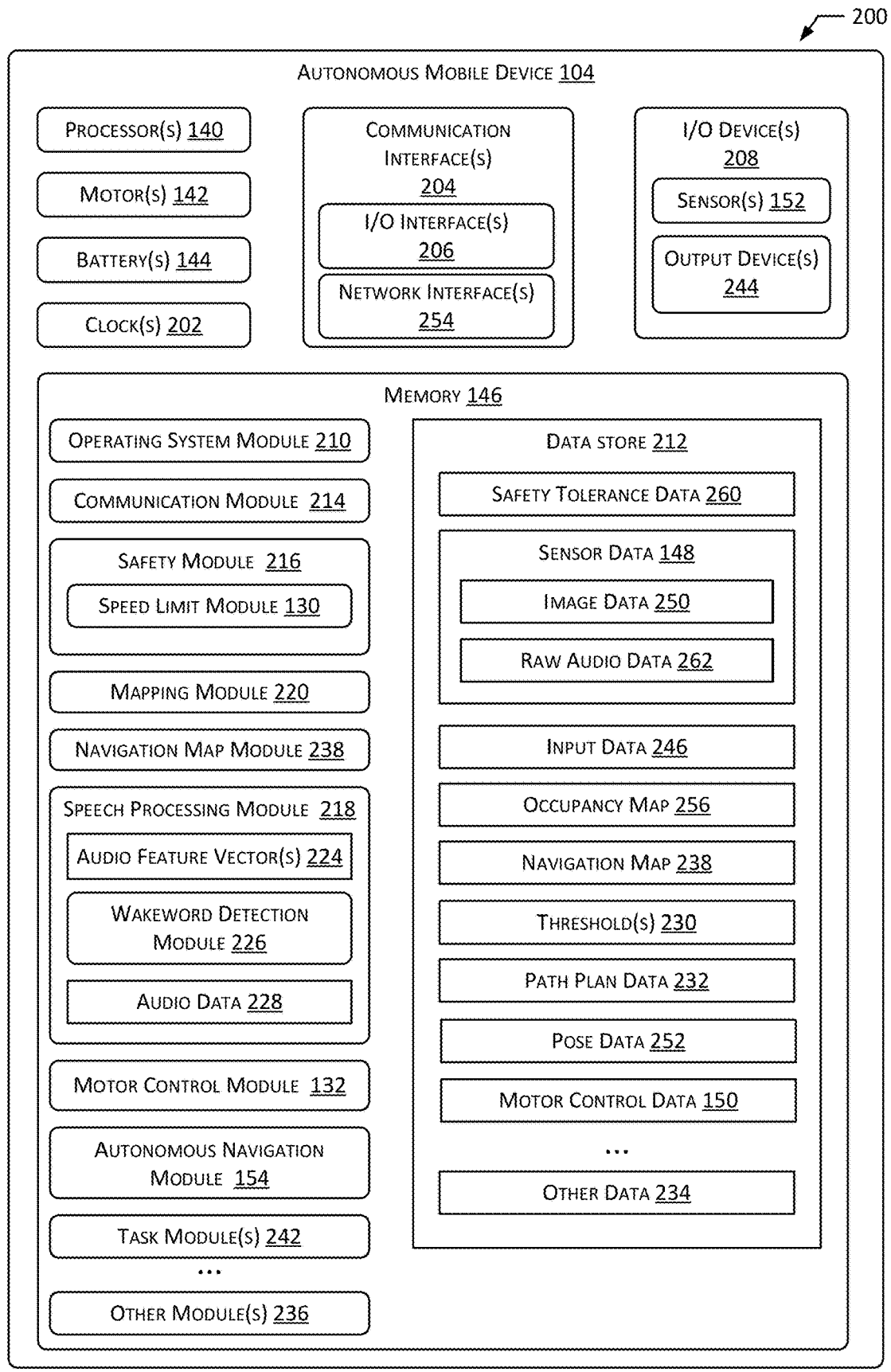
FIG. 2 is a block diagram of the components of the AMD, according to some implementations.

FIG. 2 is a block diagram 200 of the components of the AMD 104, according to some implementations.

The AMD 104 may include one or more batteries 144 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more network interfaces 254. The network interfaces 254 may include devices to connect to personal area networks (PANs), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth.

During operation, the AMD 104 may determine input data 246. The input data 246 may include or be based at least in part on sensor data 148 from the sensors 152 onboard the AMD 104. In one implementation, a speech processing module may process raw audio data 262 obtained by a microphone on the AMD 104 and produce input data 246. For example, a user may say "robot, come here" which may produce input data 246 "come here". In another implementation, the input data 246 may comprise information such as a command provided by another computing device, such as a smartphone or tablet computer.

A mapping module 220 determines a representation of the physical space 106 that includes obstacles 102 and their locations in the physical space 106. During operation, the mapping module 220 uses the sensor data 148 from various sensors 152 to determine information such as where the AMD 104 is, how far the AMD 104 has moved, the presence of obstacles 102, where those obstacles 102 are, and so forth.

The mapping module 220 uses a simultaneous localization and mapping (SLAM) module. Localization is determining where the AMD 104 is in the physical space 106 and may utilize some external reference. For example, cameras may acquire images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module may provide as output a series of poses, each pose describing a location and rotations in the physical space 106. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 106 may be determined. At successive times, and as the AMD 104 moves and additional images are acquired from locations in the physical space 106, the apparent change in position of the same feature across the additional images may be used to determine subsequent poses. In some implementations, an orientation may comprise information about six dimensions (6D), that of three orthogonal axes and corresponding rotations about those axes.

The SLAM module may also use data from other sensors 152 such as motor encoders, inertial measurement units (IMU) with one or more accelerometers and gyroscopes, and so forth. An IMU may comprise a tilt sensor 124. For example, inertial data indicative of rotations, accelerations along particular axes, and so forth obtained from the IMU may be integrated to provide information about the movement of the AMD 104.

A set of poses generated by the SLAM module over time may describe a given AMD 104 trajectory. For example, trajectory data may comprise a time series of pose data 252 from the SLAM module.

While the AMD 104 is operating, the sensors 152 may be used to acquire sensor data 148 comprising information about the physical space 106. In addition to cameras, the AMD 104 may include depth sensors that may determine depth data about the presence or absence of obstacles in the physical space 106, and so forth. For example, the sensors 152 may comprise a time-of-flight (TOF) depth camera, ultrasound, radar, and so forth. The depth data is indicative of whether an obstacle is detected or not and includes information about the distance between the sensor 152 and the obstacle and relative direction with respect to the sensor 152 of an obstacle, if detected.

The sensor data 148 may be processed to determine occupancy data. The occupancy data is indicative of a particular area in the physical space 106, relative to the pose of the AMD 104 at the time the sensor data 148 was acquired, and whether that area contains an obstacle 102 or is determined to be free from obstacles 102.

The occupancy map 256 may be manually or automatically determined as part of an exploration process. This exploration may include an explicit exploration in which the AMD 104 moves through the physical space 106 or may be incidental exploration to movement of the AMD 104. For example, explicit exploration may involve the AMD 104 starting with no occupancy map 256 and moving throughout the physical space 106 to determine occupancy data and the corresponding occupancy map 256. In another example incidental exploration may involve the AMD 104 following the user. Continuing the example, during a learning phase the user may take the AMD 104 on a tour of the physical space 106, allowing the mapping module 220 of the AMD 104 to determine occupancy data and the corresponding occupancy map 256. The user may provide input data 246 such as tags or other semantic data that designates a particular obstacle type, such as "furniture" or "fragile". In another example, during subsequent operation, the AMD 104 may generate the occupancy map 256 that is indicative of locations and types of obstacles such as chairs, doors, stairwells, and so forth as it moves unattended through the physical space 106.

Modules described herein, such as the mapping module 220, may provide various processing functions such as de-noising, filtering, and so forth. Processing of sensor data 148, such as image data 250 from a camera, may be performed by a module implementing, at least in part, one or more of the following tools or techniques. In one implementation, processing of image data 250 may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 148. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 148 or other data. For example, the ANN may be trained using a supervised learning algorithm such that object identifiers are associated with images of particular objects within training images provided to the ANN. Once trained, the ANN may be provided with the sensor data 148 and produce output indicative of the object identifier.

A navigation map module 238 uses the occupancy map 256 as input to generate a navigation map 248. For example, the navigation map module 238 may produce the navigation map 248 by inflating or enlarging the apparent size of obstacles 102 as indicated by the occupancy map 256.

The AMD 104 autonomous navigation module 154 may generate path plan data 232 that is indicative of a path through the physical space 106 from the current location to a destination location. The AMD 104 may then begin moving along the path.

While moving along the path, the AMD 104 may assess the physical space 106 and update or change the path as appropriate. For example, if an obstacle appears in the path, the mapping module 220 may determine the presence of the obstacle as represented in the occupancy map 256 and navigation map 248. The now updated navigation map 248 may then be used to plan an alternative path to the destination location.

The AMD 104 may utilize one or more task modules 242. The task module 242 comprises instructions that, when executed, provide one or more functions. The task modules 242 may perform functions such as finding a user, following a user, presenting output on output devices 244 of the AMD 104, performing sentry tasks by moving the AMD 104 through the physical space 106 to determine the presence of unauthorized people, and so forth.

The AMD 104 includes one or more output devices 244, such as one or more of a motor 142, light, speaker, display, projector, printer, and so forth. The one or more output devices 244 may be used to provide output during operation of the AMD 104. The output devices 244 are discussed in more detail with regard to FIG. 3.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

One or more clocks 202 may provide information indicative of date, time, ticks, and so forth. For example, the processor 140 may use data from the clock 202 to associate a particular time with an action, sensor data 148, and so forth.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 254, and so forth. The communication interfaces 204 enable the AMD 104, or components thereof, to communicate with other devices 166 or components. The communication interfaces 204 may include one or more I/O interfaces 208. The I/O interfaces 208 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 152, keyboard, mouse, scanner, and so forth. The I/O devices 208 may also include output devices 244 such as one or more of a motor 142, light, speaker, display, projector, printer, and so forth. In some embodiments, the I/O devices 208 may be physically incorporated with the AMD 104 or may be externally placed.

The network interfaces 254 may be configured to provide communications between the AMD 104 and other devices 166 such as other AMDs 104, the dock 160, routers, access points, and so forth. The network interfaces 254 may include devices configured to couple to personal area networks (PANs), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 146. The memory 146 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 146 provides storage of computer-readable instructions, data structures, program modules, and other data for the operation of the AMD 104. A few example functional modules are shown stored in the memory 146, although the same functionality may alternatively be implemented in hardware, firmware, or as a system on a chip (SoC).

The memory 146 may include at least one operating system (OS) module 210. The OS module 210 is configured to manage hardware resource devices such as the I/O interfaces 206, the I/O devices 208, the communication interfaces 204, and provide various services to applications or modules executing on the processors 140. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 146 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 166 including other AMDs 104, servers 164, network attached storage devices, and so forth.

A communication module 214 may be configured to establish communication with other devices 166, such as other AMDs 104, an external server 164, a dock 160, and so forth. The communications may be authenticated, encrypted, and so forth.

Other modules within the memory 146 may include a safety module 216, the mapping module 220, the navigation map module 238, the autonomous navigation module 154, the one or more task modules 242, a speech processing module 218, or other modules 236. The modules may access data stored within the data store 212, including safety tolerance data 260, sensor data 148, other data 234, and so forth.

The safety module 216 may access the safety tolerance data 260 to determine within what tolerances the AMD 104 may operate safely within the physical space 106. For example, the safety module 216 may be configured to stop the AMD 104 from moving when an extensible mast of the AMD 104 is extended. In another example, the safety tolerance data 260 may specify a minimum sound threshold which, when exceeded, stops all movement of the AMD 104. Continuing this example, detection of sound such as a human yell would stop the AMD 104.

The safety module 216 may include the speed limit module 130. The safety tolerance data 260 may include one or more of the thresholds used by the speed limit module 130. In the event the speed limit module 130 determines a stop state, movement of the AMD 104 may be stopped by one or more of inhibiting operations of one or more of the motors 142, issuing a command to stop motor operation, disconnecting power from one or more the motors 142, and so forth. The safety module 216 may be implemented as hardware, software, or a combination thereof.

The safety module 216 may control other factors, such as a maximum speed of the AMD 104 based on information obtained by the sensors 152, precision and accuracy of the sensor data 148, and so forth. For example, detection of an object by an optical sensor may include some error, such as when the distance to an object comprises a weighted average between the object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the AMD 104, and so forth.

The speech processing module 218 may be used to process utterances of the user. Microphones may acquire audio in the presence of the AMD 104 and may send raw audio data 262 to an acoustic front end (AFE). The AFE may transform the raw audio data 262 (for example, a single-channel, 16-bit audio stream sampled at 16 kHz), acquired by the microphone, into audio feature vectors 224 that may ultimately be used for processing by various components, such as a wakeword detection module 226, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 162 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 224) representing features/qualities of the raw audio data 262 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 262) may be input into a wakeword detection module 226 that is configured to detect keywords spoken in the audio. The wakeword detection module 226 may use various techniques to determine whether raw audio data 362 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 262 or the audio feature vectors 224) to one or more server(s) 164 for speech processing. The audio data 228 corresponding to audio obtained by the microphone may be processed locally on one or more of the processors 140, sent to a server 164 for routing to a recipient device or may be sent to the server 164 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 238, prior to sending to the server 164, and so forth.

The speech processing module 218 may include or access an automated speech recognition (ASR) module. The ASR module may accept as input raw audio data 262, audio feature vectors 224, or other sensor data 148 and so forth and may produce as output the input data 246 comprising a text string or other data representation. The input data 246 comprising the text string or other data representation may be processed by the navigation map module 238 to determine the command to be executed. For example, the utterance of the command "robot, come here" may result in input data 246 comprising the text string "come here". The wakeword "robot" may be omitted from the input data 246.

The autonomous navigation module 154 provides the AMD 104 with the ability to navigate within the physical space 106 without real-time human interaction. The autonomous navigation module 154 may implement, or operate in conjunction with, the mapping module 220 to determine the occupancy map 256, the navigation map 248, or other representation of the physical space 106. In one implementation, the mapping module 220 may use one or more simultaneous localization and mapping ("SLAM") techniques. The SLAM algorithms may utilize one or more of maps, algorithms, beacons, or other techniques to navigate. The autonomous navigation module 154 may use the navigation map 248 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 142 connected to the wheels. For example, the autonomous navigation module 154 may determine the current location within the physical space 106 and determine path plan data 232 that describes the path to a destination location.

The AMD 104 may use the autonomous navigation module 154 to navigate to a docking area that includes the dock 160. For example, if the AMD 104 determines to recharge one or more batteries 144, then the AMD 104 may use path plan data 232 to navigate to a destination location that is in front of the dock 160. The destination location is far enough in front of the dock 160 that the AMD 104 is able to turn around. As described above, after the AMD 104 turns around in front of the dock 160, the AMD 104 may begin to move backward to dock using the inductive sensors to align the AMD 104 with the dock 160. For example, instructions to the motors 142 may be indicated by motor control data 150 and executed by the motor controller. In this example, the AMD 104 may comprise at least a first wheel on a first side and a second wheel on a second side. The motor control data 150 may indicate a rotational velocity of the first wheel as $V_1$ and a rotational velocity of the second wheel as $V_2$, where $V_1$ is greater than $V_2$, and where the difference between $V_1$ and $V_2$ results in the AMD 104 turning in a first direction. Similarly, to turn in an opposite direction from the first direction, the motor control data 150 may indicate a rotational velocity of the first wheel as $V_1$ and a rotational velocity of the second wheel as $V_2$, where $V_2$ is greater than $V_1$. To move straight backward, the motor control data 150 may indicate a rotational velocity of the first wheel as $V_1$ and a rotational velocity of the second wheel as $V_2$, where $V_1$ is equal to $V_2$.

The autonomous navigation module 154 may utilize various techniques during processing of sensor data 148. For example, image data 250 obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 140, in response to a command received from one or more communication interfaces 204, as determined from the sensor data 148, and so forth. For example, an external server 164 may send a command that is received using the network interface 254. This command may direct the AMD 104 to proceed to find a particular user, follow a particular user, and so forth. The AMD 104 may then process this command and use the autonomous navigation module 154 to determine the directions and distances associated with carrying out the command. For example, the command to "come here" may result in the task module 242 sending a command to the autonomous navigation module 154 to move the AMD 104 to a particular location near the user and orient the AMD 104 in a particular direction.

The AMD 104 may connect to the network 162 using one or more of the network interfaces 254. In some implementations, one or more of the modules or other functions described here may execute on the processors 140 of the AMD 104, on the server 164, or a combination thereof. For example, one or more servers 164 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth. The data store 212 may also store values for various thresholds 230.

Figure 3:
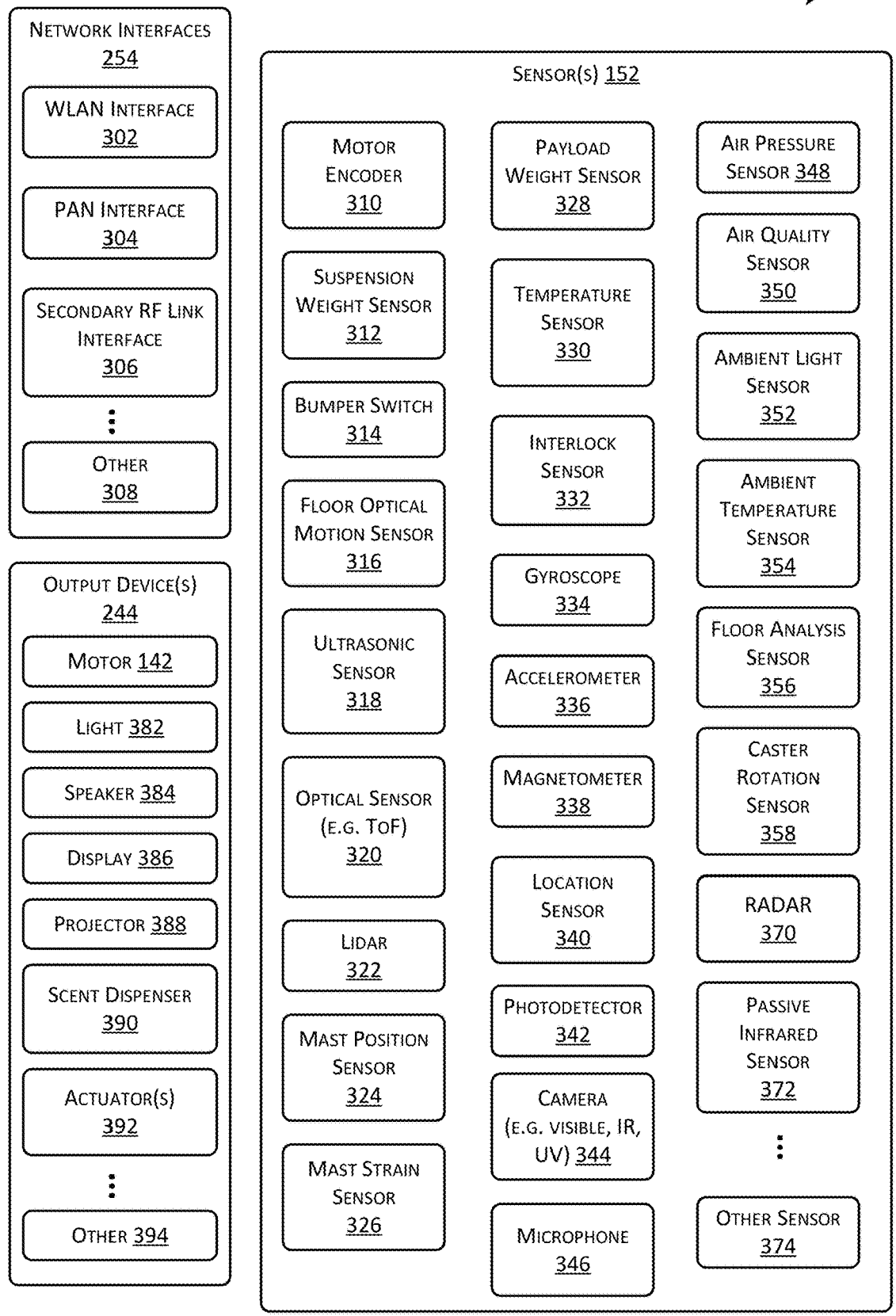
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 254, output devices 244, or sensors 152 depicted here, or may utilize components not pictured. One or more of the sensors 152, output devices 244, or a combination thereof may be included on a moveable component that may be panned, tilted, rotated, or any combination thereof with respect to a chassis of the AMD 104.

The network interfaces 254 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 166 in the event that communication fails using one or more of the WLAN interface 302 or the PAN interface 304. For example, in the event the AMD 104 travels to an area within the physical space 106 that does not have Wi-Fi coverage, the AMD 104 may use the secondary RF link interface 306 to communicate with another device such as a specialized access point, dock 160, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 152. The sensors 152 depicted here are provided by way of illustration and not necessarily as a limitation. It is understood that other sensors 152 may be included or utilized by the AMD 104, while some sensors 152 may be omitted in some configurations.

A motor encoder 310 provides information indicative of the rotation or linear extension of a motor 142. The motor 142 may comprise a rotary motor, or a linear actuator. In some implementations, the motor encoder 310 may comprise a separate assembly such as a photodiode and encoder wheel that is affixed to the motor 142. In other implementations, the motor encoder 310 may comprise circuitry configured to drive the motor 142. For example, the autonomous navigation module 154 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 142. For example, if the suspension weight sensor 312 indicates no weight on the suspension, the implication is that the AMD 104 is no longer resting on its wheels, and thus operation of the motors 142 may be inhibited. In another example, if the suspension weight sensor 312 indicates weight that exceeds a threshold value, the implication is that something heavy is resting on the AMD 104 and thus operation of the motors 142 may be inhibited. For example, the threshold value may comprise a weight of a load that compresses a suspension system to a minimum height, or results in a mass that exceeds a torque output of the motors 142 to maintain a minimum acceleration.

One or more bumper switches 314 provide an indication of physical contact between a bumper or other member that is in mechanical contact with the bumper switch 314. The safety module 216 utilizes sensor data 148 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 152 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 148 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 100 FOV, allowing the sensor to have an overall FOV of 40°.

In another implementation, a structured light pattern may be provided by the optical emitter. A portion of the structured light pattern may then be detected on the object using a sensor 152 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 154 may utilize the sensor data 148 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 148 may be generated that is indicative of the presence of objects and the relative positions, shapes, and so forth that are visible to the lidar 322. Data from the lidar 322 may be used by various modules. For example, the autonomous navigation module 154 may utilize point cloud data generated by the lidar 322 for localization of the AMD 104 within the physical space 106.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 148 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 144, one or more motors 142, and so forth. In the event the temperature exceeds a threshold value, the component associated with that device temperature sensor 330 may be shut down. For example, the threshold value may be determined based on component specifications, such as a maximum permissible temperature of the batteries 144.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 148 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 148 indicative of impinging light. For example, the photodetector 342 may provide data indicative of a color, intensity, duration, and so forth.

A camera 344 generates sensor data 148 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 148 comprising images being sent to the autonomous navigation module 154. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 154 may be acquired using a rolling shutter and subsequently may be processed to mitigate image artifacts.

One or more microphones 346 may be configured to acquire information indicative of sound present in the physical space 106. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 106 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 154, the task module 242, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 490 at a second time.

The sensors 152 may include a radar 370. The radar 370 may be used to provide information as to a distance, lateral position, and so forth, to an object.

The sensors 152 may include a passive infrared (PIR) sensor 372. The PIR 372 sensor may be used to detect the presence of users, pets, hotspots, and so forth. For example, the PIR sensor 372 may be configured to detect infrared radiation with wavelengths between 8 and 14 micrometers.

The AMD 104 may include other sensors 374 as well. For example, a capacitive proximity sensor may be used to provide proximity data to adjacent objects. Other sensors 374 may include radio frequency identification (RFID) readers, near field communication (NFC) systems, coded aperture cameras, and so forth. For example, NFC tags may be placed at various points within the physical space 106 to provide landmarks for the autonomous navigation module 154. One or more touch sensors may be utilized to determine contact with a user or other objects.

The AMD 104 may include one or more output devices 244. A motor 142 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 142 with an eccentric weight may be used to create a buzz or vibration to allow the AMD 104 to simulate the purr of a cat.

Figure 4:
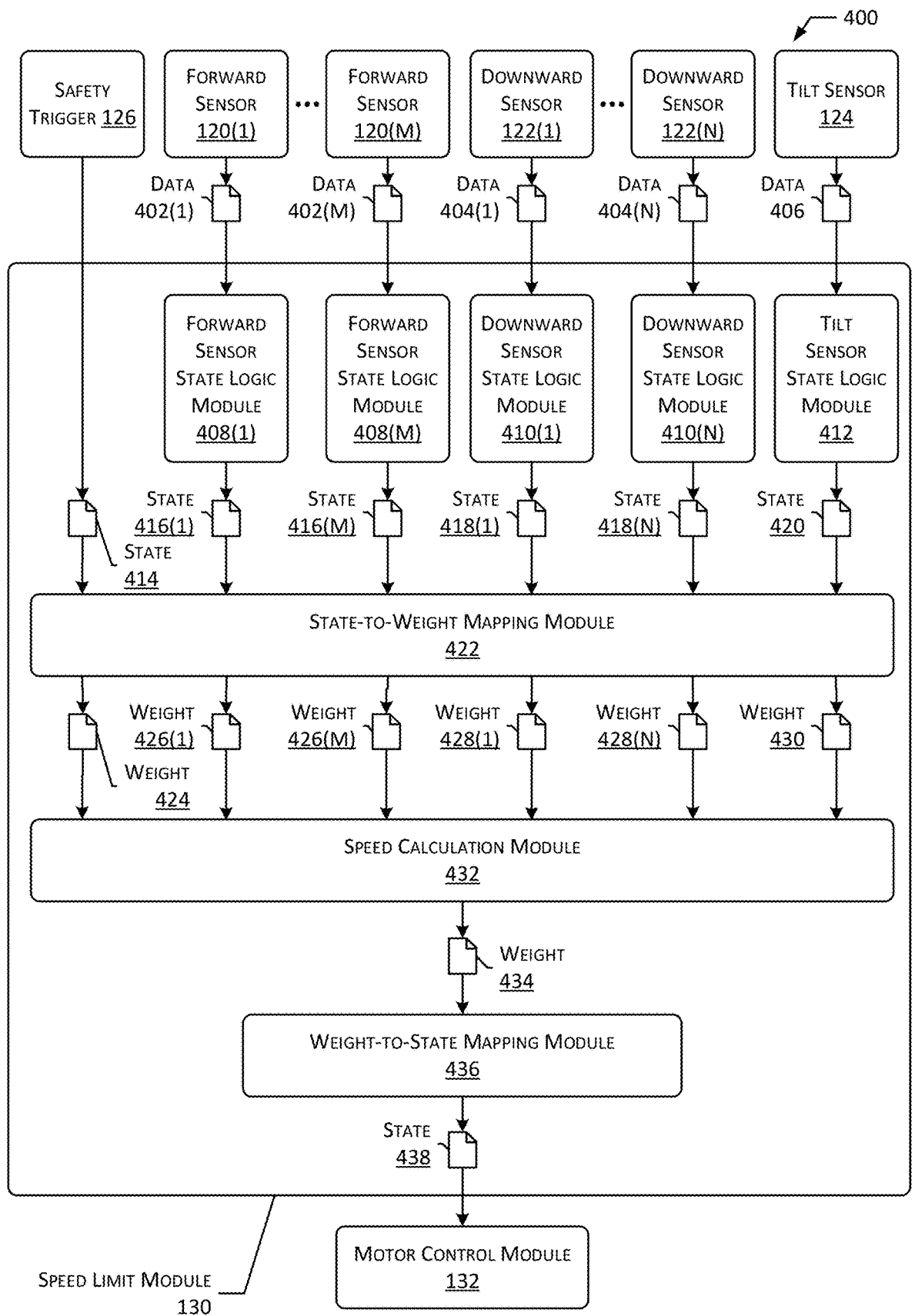
FIG. 4 illustrates a speed control system for an AMD using different types of sensors, according to some implementations.

FIG. 4 illustrates a speed control system 400 for an AMD 104 using different types of sensors, according to some implementations.

In a first implementation, state 414, 416(1)-(M), 418(1)-(N), and 420 data is used by a state-to-weight mapping module 422 to determine weight 424, 426(1)-(M), 428(1)-(N), and 430 data. The speed calculation module 432 uses the weight 424, 426(1)-(M), 428(1)-(N), and 430 data to determine a single weight 434. The weight-to-state mapping module 436 uses the weight 434 to determine a state 438 used by the motor control module 132 to determine a speed value. The first implementation is described below.

The AMD 104 may include a speed limit module 130 that uses data from one or more forward sensors 120(1)-(M), one or more downward sensors 122(1)-(N), a tilt sensor 124, and a safety trigger 126. The speed limit module 130 determines an operating state 432 based sensor data 402(1)-(M), 404(1)-(N), 406, and safety trigger 126 state 434 data. The operating state 438 is used by the motor control module 132 to operate the AMD 104 based on a speed value associated with the operating state 438.

The speed limit module 130 may include state logic modules that use sensor data to determine an operating state. In this example, for individual sensor data 402, 404, 406 from each individual sensor 120, 122, 124, the speed limit module 130 determines an individual operating state 414, 416, 418, 420. As described with respect to FIG. 1, the safety trigger 126 may be implemented by an interrupt handler that generates a stop state 414 based on one or more interrupts from one or more of the sensors 120, 122, 124 that are indicative of non-responsiveness, malfunction, or unreliable operation. Flow diagrams for the forward sensor state logic module 408, downward sensor state logic module 410, and tilt sensor state logic module 412 is described in greater detail with respect to FIGS. 5-7.

Forward sensor 120(1) determines data 402(1), and forward sensor state logic module 408(1) uses data 402(1) to determine an operating state 416(1). Continuing this example, each individual forward sensor 120(1)-(M) determines individual sensor data 402(1)-(M). Similarly, each individual downward sensor 122(1)-(N) determines individual sensor data 404(1)-(N). Tilt sensor 124 determines data 406 indicating a tilt value of the AMD 104. In one example, a tilt value may be a tilt value of a chassis of the AMD 104. In another example, a tilt value may be a tilt value of a horizontal axis between wheels of the AMD 104, where the horizontal axis is parallel to a floor.

Forward sensor logic module 408(1) determines state 416(1). Similarly, each individual forward sensor state logic module 408(1)-(M) uses individual sensor data 402(1)-(M) to determine individual state 416(1)-(M) data. In this example, each individual downward sensor state logic module 410(1)-(N) uses individual sensor data 404(1)-(N) to determine individual state 418(1)-(N) data. The tilt sensor state logic module 412 uses tilt sensor 124 data 406 to determine state 420 data.

The state-to-weight mapping module 422 maps each individual state 414, 416(1)-(M), 418(1)-(N), 420 data to individual weight 424, 426(1)-(M), 428(1)-(N), 430 data. For example, a normal state may map to a first weight value, a caution state may map to a second weight value, a slow state may map to a third weight value, and a stop state may map to a fourth weight value. In this example, the first weight value is greater than the second weight value, the second weight value is greater than the third weight value, and the third weight value is greater than the fourth weight value.

The speed calculation module 432 may use the individual weights 424, 426(1)-(M), 428(1)-(N), 430 to determine a single weight 434 value. For example, the speed calculation module 432 may determine the weight 434 to be a minimum weight value among the individual weights 424, 426(1)-(M), 428(1)-(N), 430. By determining the weight 434 to be the minimum weight value, the AMD 104 operates as a speed associated with a state with a slowest range of speeds. In this example, the speed calculation module 432 determines weight 434 based on a minimum value of weights 424, 426(1)-(M), 428(1)-(N), 430, but the speed calculation module 432 may determine weight 434 using other techniques. For example, the speed calculation module 432 may determine weight 434 as a weighted average of the weights 424, 426(1)-(M), 428(1)-(N), 430. In this example, a weighted value associated with the stop state may have the largest weighted value and a weighted value associated with the normal state may have the smallest weighted value. In other examples, weighted values may be associated with a type of sensor. For example, downward sensors may be associated with a largest weighted value to emphasize priority of obstacles in front of and downward of the AMD 104.

The weight-to-state mapping module 436 may use the weight 434 determined by the speed calculation module 432 to determine a state 438 used to operate the AMD 104. For example, if weight 434 value is the first weight value, then the state 438 is a normal state. If weight 434 value is the second weight value, then the state 438 is a caution state. If weight 434 value is the third weight value, then the state 438 is a slow state. If weight 434 value is the fourth weight value, then the state 438 is a stop state.

The motor control module 132 may use the state 438 to determine an operating speed. For example, if state 438 indicates a normal state, then the motor control module 132 may operate the AMD 104 at a speed within a first range of speeds. If state 438 indicates a caution state, then the motor control module 132 may operate the AMD 104 at a speed within a second range of speeds. If state 438 indicates a slow state, then the motor control module 132 may operate the AMD 104 at a speed within a third range of speeds. If state 438 indicates a stop state, then the motor control module 132 may operate the AMD 104 at a speed within a fourth range of speeds. In this example, the first range of speeds may include speeds greater than 0.75 meters per second (m/s) and less than or equal to 1.0 m/s. The second range of speeds may include speeds greater than 0.25 m/s and less than or equal to 0.75 m/s. The third range of speeds may include speeds greater than 0.0 m/s and less than or equal to 0.25 m/s. The fourth range of speeds may be a speed of 0.0 m/s. In other implementations, the range of speeds may be greater or less than the ranges of speeds listed above.

In a second implementation, the speed limit module 130 may use sensor data 402(1)-(M), 404(1)-(N), 406, and safety trigger 126 data to determine a speed value for the AMD 104 based on a speed calculation module 432 that uses results from individual sensor state logic modules 408(1)-(M), 410(1)-(N), and 412 to determine an operating speed for the AMD 104. For example, as depicted in FIG. 4, individual sensor state logic modules 408(1)-(M), 410(1)-(N), and 412 may use sensor data 402(1)-(M), 404(1)-(N), and 406. In this second implementation, in contrast to the first implementation, the individual sensor state logic modules 408(1)-(M), 410(1)-(N), and 412 use the sensor data 402(1)-(M), 404(1)-(N), and 406 to determine an individual speed or an individual range of speeds. For example, similar to the first implementation, each sensor state logic module 408(1)-(M), 410(1)-(N), and 412 uses flow diagrams similar to those described in FIGS. 5-7.

In this second implementation, each flow diagram, instead of determining an individual state, determines an individual speed or range of speeds. For example, for each flow diagram: instead of determining a stop state, the flow diagrams determine a first speed or first range of speeds; instead of determining a slow state, the flow diagrams determine a second speed or second range of speeds; instead of determining a caution state, the flow diagrams determine a third speed or third range of speeds; and instead of determining a normal state, the flow diagrams determine a fourth speed or fourth range of speeds. The first speed or first range of speeds may be less than the second speed or second range of speeds. The second speed or second range of speeds may be less than the third speed or third range of speeds. The third speed or third range of speeds may be less than the fourth speed or fourth range of speeds.

The speed calculation module 432 may determine a minimum speed value from among the individual speeds or ranges of speeds from the sensor state logic modules 408(1)-(M), 410(1)-(N), and 412 to determine an operating speed for the AMD 104. If the safety trigger 126 data does not indicate an interrupt, then the speed value determined by the speed limit module 130 is the minimum speed based on the individual speed or speeds determined by the sensor state logic modules 408(1)-(M), 410(1)-(N), and 412. If the safety trigger 126 data indicates an interrupt, then the minimum speed value determined by the speed limit module 130 is zero. The speed limit module 130 may provide the motor control module 132 with motor encoder data indicating the minimum speed value.

In some implementations, as described above, the speed limit module 130 may use sensor data from fewer sensors than depicted in FIG. 4. For example, the speed limit module 130 may use data from a first sensor and a second sensor. At a first time, the AMD 104 may determine a first speed value. For example, the AMD 104 may be in a normal state and moving at the first speed value. The first sensor may be a downward sensor 122 and the second sensor may be a tilt sensor 124. The AMD 104 may use the first sensor to determine a first distance value indicative of a distance between the AMD 104 and a first obstacle 102 within a physical space 106. The AMD 104 may use the second sensor to determine a tilt value indicative of a tilt of the AMD 104. Based on the first distance value and on the tilt value, the AMD 104 may determine a second speed value that is less than the first speed value. At the second time, the AMD 104 may operate based on the second speed value by providing a motor control module 132 with motor encoder data indicating the second speed value.

Figure 5:
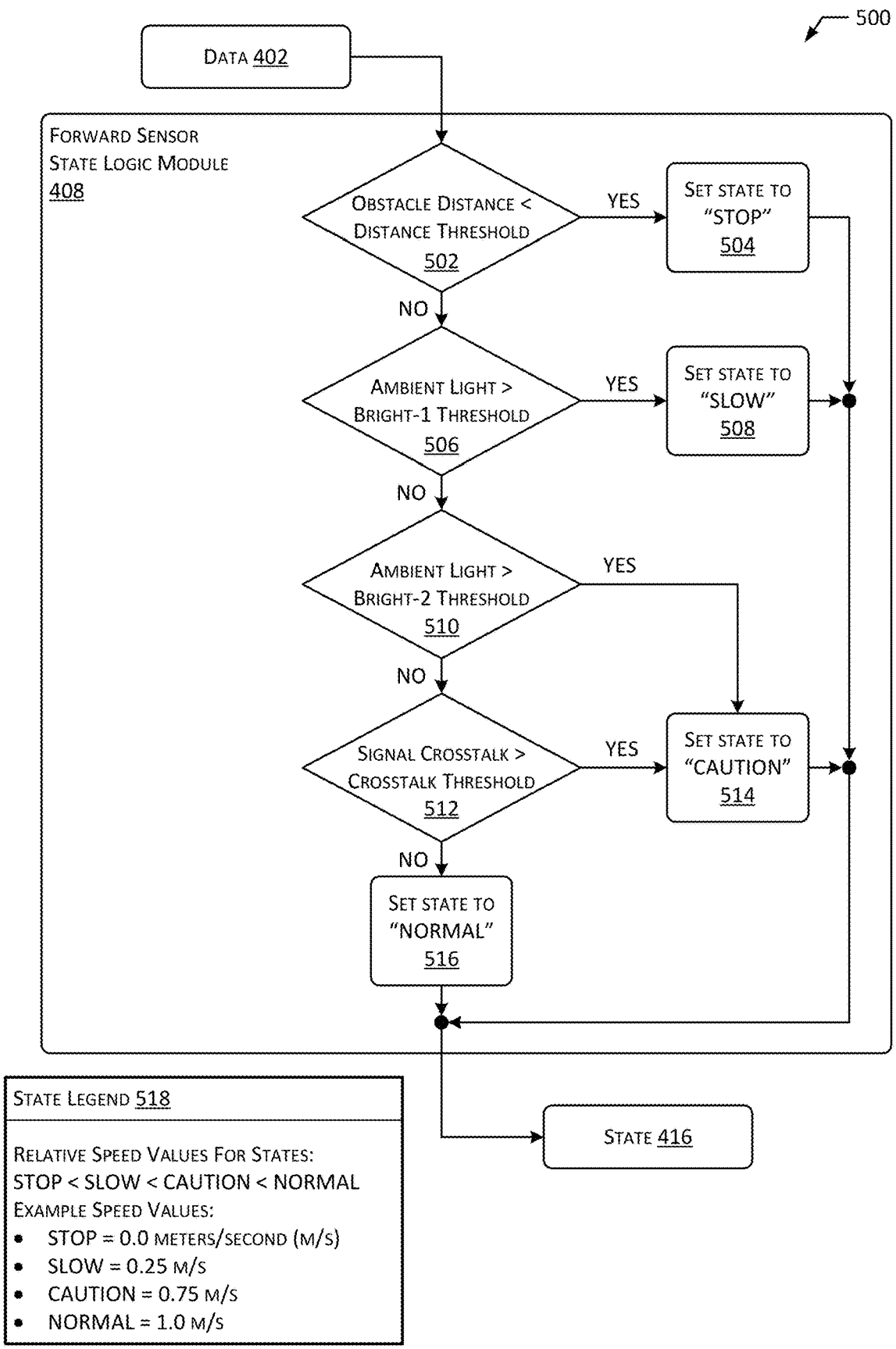
FIG. 5 illustrates a flow diagram for forward sensor state logic module, according to some implementations.

FIG. 5 illustrates a flow diagram 500 for forward sensor state logic module 408, according to some implementations.

As described with respect to FIG. 4, forward sensor state logic module 408 uses sensor data 402 to determine an operating state 416. Individual forward sensors 120 may determine individual sensor data 402. Individual forward sensor 120 data 402 is used by the forward sensor state logic module 408 to determine an individual operating state 416.

In this example, at 502, the forward sensor state logic module 408 may determine whether an obstacle distance is less than a distance threshold. Sensor data 402 may indicate one or more distances to one or more physical points on one or more physical surfaces within the field of view 108. The obstacle distance may be based on the one or more distances. The sensor data 402 may also indicate a brightness measurement of an ambient environment of physical space. The first value may be measured in lux. If the obstacle distance is less than the distance threshold, then the process continues to 504. If the obstacle distance is greater than or equal to the distance threshold, then the process continues to 506.

At 504, the operating state is determined to be a stop state, and the forward sensor state logic module 408 determines state 416 to be the stop state. The state 416 is then used by the state-to-weight mapping module 422.

At 506, the forward sensor state logic module 408 may determine whether an ambient light level is greater than a first brightness threshold. Ambient light levels above a first brightness threshold are associated with a slow state. The first brightness threshold is depicted as bright-1 threshold. In some situations, ambient light levels greater than the first brightness threshold may result in incorrect readings of the sensor. For example, the sensor may incorrectly report an obstacle when none is present or may report no obstacle detected due to the sensor being blinded. The ambient light level may be indicated by the sensor data 402. In this example, the first brightness threshold may be 5 kilolux (klux). In other examples, the first brightness threshold may be larger or smaller. If the ambient light level is greater than the first brightness threshold, then the process continues to 508. If the ambient light level is less than or equal to the first brightness threshold, then the process continues to 510.

In some implementations, forward sensors 120 may comprise ultrasonic sensors and data 402 may include an indication of an ambient noise level. In this implementation, at 506, the forward sensor state logic module 408 may determine whether the ambient noise level is greater than a first noise level threshold. In this example, the higher an ambient noise level, the more slowly the AMD 104 moves to move at a safe speed. The first noise level threshold may be associated with a speed or a range of speeds at which the AMD 104 is at the slow state. If the ambient noise level is greater than the first noise level threshold, then the process continues to 508. If the ambient noise level is less than or equal to the first noise level threshold, then the process continues to 510.

Continuing with this implementation, at 510, the forward sensor state logic module 408 may determine whether an ambient noise level indicated by data 402 is greater than a second noise level threshold. The second noise level threshold may be associated with a speed or range of speeds for the caution state. If the ambient noise level is greater than the second noise level threshold, then the process continues to 514. If the ambient noise level is less than or equal to the second noise level threshold, then the process continues to 512.

At 508, the operating state is determined to be a slow state, and the forward sensor state logic module 408 determines the state 416 to be the slow state. The state 416 is then used by the state-to-weight mapping module 422.

At 510, the forward sensor state logic module 408 may determine whether the ambient light level is greater than a second brightness threshold. Ambient light levels above the second brightness threshold are associated with a caution state. The second brightness threshold is depicted as bright-2 threshold. In some situations, ambient light levels greater than the second brightness threshold may result in incorrect readings of the sensor. For example, the sensor may incorrectly report an obstacle 102 when none is present or may report no obstacle 102 detected due to the sensor being blinded. In this example, the second brightness threshold may be 1 klux. In other examples, the second brightness threshold may be larger or smaller. If the ambient light level is greater than the second brightness threshold, then the process continues to 514. If the ambient light level is less than or equal to the second brightness threshold, then the process continues to 512.

At 512, the forward sensor state logic module 408 may determine whether signal crosstalk is greater than a crosstalk threshold. Signal crosstalk occurs when an output from an emitter of a first sensor or second sensor results in signal noise that adversely affects the input of the first sensor or the second sensor. In some implementations, the forward sensors 120 may be installed behind a transparent cover for protection from dust, dirt, moisture, or other contaminants. Clean, clear covers may be associated with a reference threshold of signal crosstalk. Signal crosstalk may be indicated in sensor data 402 as a crosstalk measurement. In this example, a crosstalk threshold may be indicative of a level of crosstalk that is greater than the reference threshold. In an example where the forward sensors 120 are time-of-flight sensors, there may be different circumstances that result in crosstalk. As a first example, the forward sensors 120 may be implemented by four time-of-flight sensors. If a first forward sensor of the forward sensors 120 has a transparent cover that is dirty or covered, then an emitted light may reflect back to a photo sensor too quickly to be an obstacle in front of the AMD 104. For example, a distance associated with the reflected signal may be a distance that is less than or equal to a distance from an emitter on a forward sensor to a transparent cover. As a second example, if the forward sensors 120 comprise more than one time-of-flight sensors, then dirt or a covering of a transparent cover of a first forward sensor may reflect a signal back to a second forward sensor that is located near the first forward sensor. If the signal crosstalk is greater than the crosstalk threshold, then the process continues to 514. If the signal crosstalk is less than or equal to the crosstalk threshold, then the process continues to 516.

At 514, the operating state is determined to be a caution state, and the forward sensor state logic module 408 determines the state 416 to be the caution state. The state 414 is then used by the state-to-weight mapping module 422.

At 516, the operating state is determined to be a normal state, and the forward sensor state logic module 408 determines the state 416 to be the normal state. The state 416 is then used by the state-to-weight mapping module 422. In this example, at 516, the state 416 is determined to be a normal state based on ambient light levels not being too high and on no obstacles being within a distance threshold.

Figure 6:
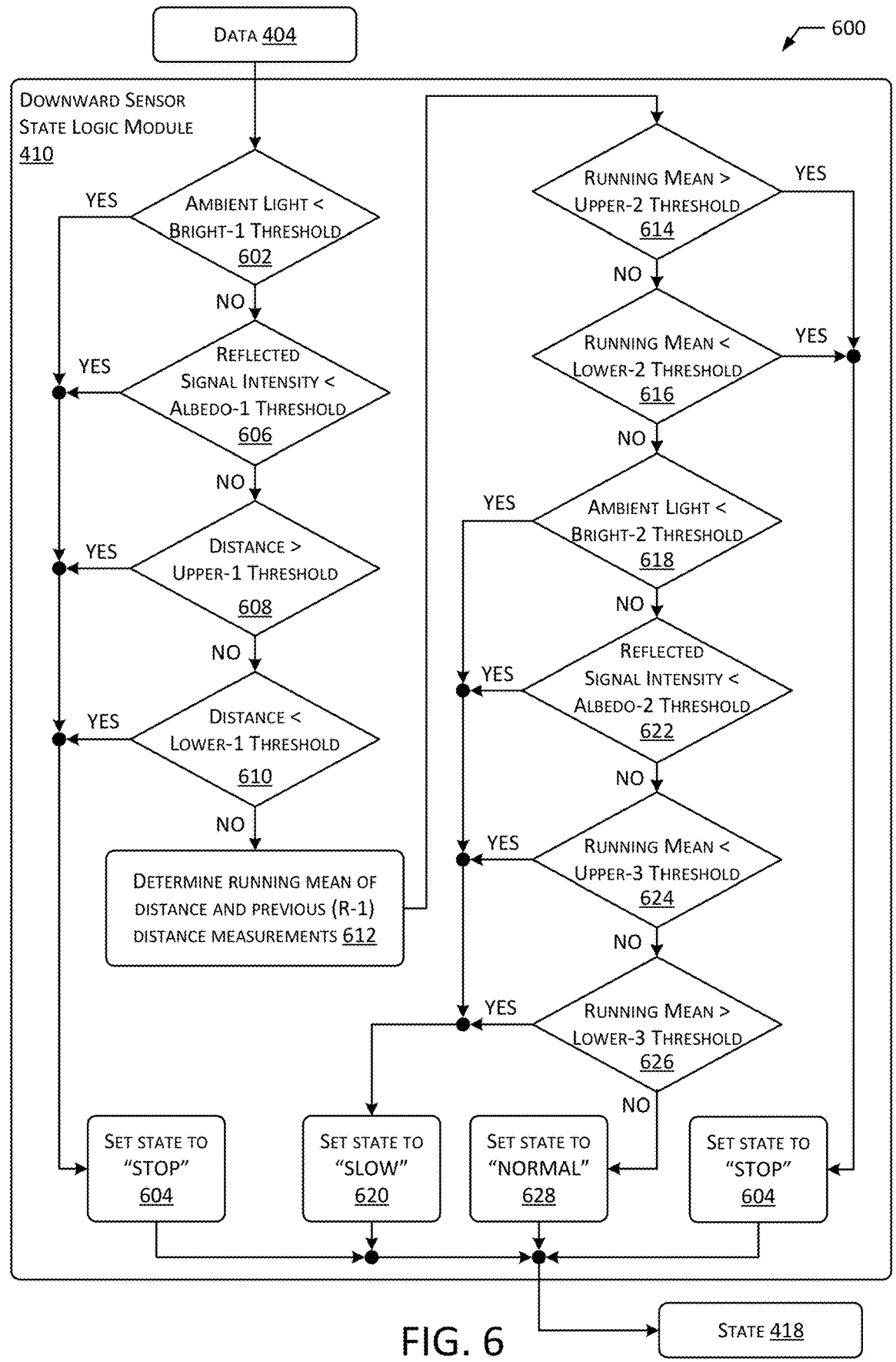
FIG. 6 illustrates a flow diagram for downward sensor state logic module, according to some implementations.

FIG. 6 illustrates a flow diagram 600 for downward sensor state logic module 410, according to some implementations.

As described with respect to FIG. 4, downward sensor state logic module 410 uses sensor data 404 to determine an operating state 418. Individual downward sensors 122 may determine individual sensor data 414. Individual downward sensor 122 data 404 is used by the downward sensor state logic module 410 to determine an individual operating state 418.

In this example, at 602, the downward sensor state logic module 410 may determine whether an ambient light level is less than a first brightness threshold. The first brightness threshold is depicted as bright-1 threshold. Ambient brightness above the first brightness threshold is associated with a stop state. The ambient light level may be indicated by the sensor data 404. Ambient light levels may be measured at a time when no light by the sensor has been emitted and is indicative of light received from a surrounding environment. In this example, the first brightness threshold may be 5 kilolux (klux). In other examples, the first brightness threshold may be larger or smaller. If the ambient light level is greater than or equal to the first brightness threshold, then the process continues to 606. If the ambient light level is less than the first brightness threshold, then the process continues to 604.

At 604, the operating state is determined to be a stop state, and the downward sensor state logic module 410 determines the state 418 to be the stop state. The state 418 is then used by the state-to-weight mapping module 422.

At 606, the downward sensor state logic module 410 may determine whether reflected signal intensity is less than a first albedo threshold. The first albedo threshold is depicted as albedo-1 threshold. An albedo measurement is associated with a measure of light reflection. A light colored, highly reflective surface is associated with a high albedo measure. In contrast, a darker, low reflective surface is associated with a low albedo measure. In this example, a reflected signal intensity from emitted light is used to measure albedo of a floor surface. In this example, two different albedo thresholds are determined. Whether a floor surface is too dark is indicated by the reflected signal intensity being less than the first albedo threshold. If the reflected signal intensity is less than the first albedo threshold, then the process continues to 604. If the reflected signal intensity is greater than or equal to the first albedo threshold, then the process continues to 608.

At 608, the downward sensor state logic module 410 may determine whether an obstacle distance is greater than a first upper distance threshold. The first upper distance threshold is depicted as upper-1 threshold. Sensor data 404 may indicate one or more distances to one or more physical points on one or more physical surfaces within the field of view 110. The obstacle distance may be based on the one or more distances. If the obstacle distance is less than or equal to the first upper distance threshold, then the process continues to 610. If the obstacle distance is greater than the first upper distance threshold, then the process continues to 604. The first upper distance threshold may be associated with a down ramp with a slope that is large enough to be associated with a stop state. The larger the obstacle distance, the farther away the floor is from the AMD 104 as the floor slopes downward.

In some examples, the obstacle distance may be adjusted based on a tilt value. For example, if the AMD 104 is tilted, then a distance measurement from the downward sensors 404 may not accurately represent a floor topology. For example, if the AMD 104 is moving over a threshold, then as the AMD 104 begins to move up and over the threshold, the distance measurements from the downward sensors 122 may indicate that the floor is a greater distance away than is accurate. To adjust the distance measurement, the downward sensor state logic module 410 may use the tilt value to determine an adjustment value indicative of an additional distance from the downward sensor to the floor based on a pitch angle of the AMD 104. The pitch value is based on the tilt value.

At 610, the downward sensor state logic module 410 may determine whether the obstacle distance is less than a first lower distance threshold. The first lower distance threshold is depicted as lower-1 threshold. If the obstacle distance is less than the first lower distance threshold, then the process continues to 604. If the obstacle distance is greater than or equal to the first lower distance threshold, then the process continues to 612. The first lower distance threshold may be associated with an up ramp with a slope that is large enough to be associated with a stop state. The smaller the obstacle distance, the closer the floor is to the AMD 104 as the floor slopes upward.

At 612, the downward sensor state logic module 410 may determine a running mean of the obstacle distance and a previous (R−1) obstacle distance measurements. Each of the previous (R−1) obstacle distance measurement may be stored within memory 146 as the downward sensors 404 determine distance measurements. The remaining steps 614, 620, 622, 624, 626 use the running mean of obstacle distances to determine threshold comparisons. At 612, the downward sensor state logic module 410 may also calculate a running mean of ambient light levels. For example, data 404 may indicate a brightness level of the ambient environment, and the downward sensor logic module 410 may determine a running mean of ambient light levels based on the ambient light level and previous (R−1) ambient light levels.

At 614, the downward sensor state logic module 410 may determine whether the running mean of the obstacle distance is greater than a second upper distance threshold. The second upper distance threshold is depicted as upper-2 threshold. Step 614 is similar to step 608, except where step 608 uses a single measurement of an obstacle distance, step 614 uses the running mean of the obstacle distance. If the running mean of the obstacle distance is greater than the second upper distance threshold, then the process continues to 604. If the running mean of the obstacle distance is less than or equal to the second upper distance threshold, then the process continues to 616. The second upper distance threshold may be associated with a down ramp with a slope that is large enough to be associated with a stop state. The larger the running mean of the obstacle distance, the farther away the floor is from the AMD 104 as the floor slopes downward.

At 616, the downward sensor state logic module 410 may determine whether the running mean of the obstacle distance is less than a second lower distance threshold. The second lower distance threshold is depicted as lower-2 threshold. Step 616 is similar to step 610, except where step 610 uses a single measurement of an obstacle distance, step 616 uses the running mean of the obstacle distance. If the running mean of the obstacle distance is less than the second lower distance threshold, then the process continues to 604. If the running mean of the obstacle distance is greater than or equal to the second lower distance threshold, then the process continues to 618. The second lower distance threshold may be associated with an up ramp with a slope that is large enough to be associated with a stop state. The smaller the running mean of the obstacle distance, the closer the floor is to the AMD 104 as the floor slopes upward.

At 618, the downward sensor state logic module 410 may determine whether a running mean of the ambient light level is less than a second brightness threshold associated with a slow state. The second brightness threshold is depicted as bright-2 threshold. Step 618 is similar to step 602, except where step 602 uses a single measurement of an ambient light level, step 618 uses the running mean of the ambient light level. In this example, the second brightness threshold may be 1 klux. In other examples, the second brightness threshold may be larger or smaller. If the running mean of the ambient light level is less than the second brightness threshold, then the process continues to 620. If the running mean of the ambient light level is greater than or equal to the second brightness threshold, then the process continues to 622.

At 620, the operating state is determined to be a slow state, and the downward sensor state logic module 410 determines the state 418 to be the slow state. The state 418 is then used by the state-to-weight mapping module 422.

At 622, the downward sensor state logic module 410 may determine whether reflected signal intensity is greater than a second albedo threshold. The second albedo threshold is depicted as albedo-2 threshold. If the reflected signal intensity is less than the second albedo threshold, then the process continues to 620. If the reflected signal intensity is greater than or equal to the second albedo threshold, then the process continues to 624.

At 624, the downward sensor state logic module 410 may determine whether the running mean of the obstacle distance is less than a third upper distance threshold. The third upper distance threshold is depicted as upper-3 threshold. Step 624 is similar to step 610, except where step 610 transitions to a stop state based on a single measurement of an obstacle distance, step 624 transitions to a slow state based on the running mean of the obstacle distance. If the running mean of the obstacle distance is less than the third upper distance threshold, then the process continues to 620. If the running mean of the obstacle distance is greater than or equal to the third upper distance threshold, then the process continues to 626. The third upper distance threshold may be associated with a down ramp with a slope that is large enough to be associated with a stop state.

At 626, the downward sensor state logic module 410 may determine whether the running mean of the obstacle distance is greater than a third lower distance threshold. The third lower distance threshold is depicted as lower-3 threshold. If the running mean of the obstacle distance is greater than the third lower distance threshold, then the process continues to 620. If the running mean of the obstacle distance is less than or equal to the third lower distance threshold, then the process continues to 628. The third lower distance threshold may be associated with a down ramp with a slope that is large enough to be associated with a slow state. The larger the running mean of the obstacle distance, the farther away the floor is from the AMD 104 as the floor slopes downward.

At 628, the operating state is determined to be a normal state, and the downward sensor state logic module 410 determines the state 418 to be the normal state. The state 418 is then used by the state-to-weight mapping module 422.

Figure 7:
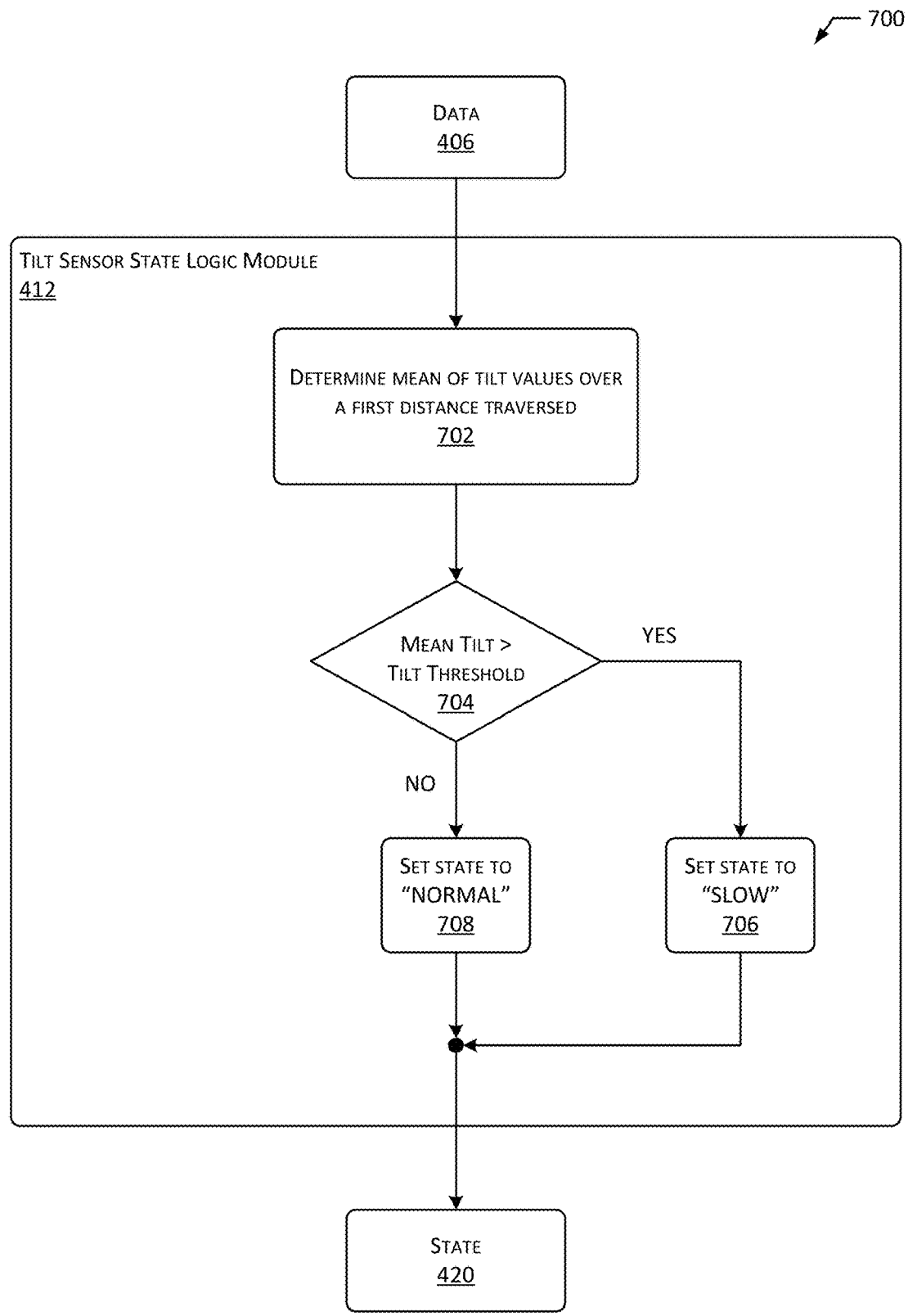
FIG. 7 illustrates a flow diagram for tilt sensor state logic module, according to some implementations.

FIG. 7 illustrates a flow diagram 700 for tilt sensor state logic module 412, according to some implementations.

As described with respect to FIG. 4, the AMD 104 may include a speed limit module 130 that uses data from one or more forward sensors 120(1)-(M), one or more downward sensors 122(1)-(N), a tilt sensor 124, and a safety trigger 126. Tilt sensor state logic module 412 uses sensor data 406 to determine an operating state 414. The operating state 414 is used by other modules within the speed limit module 130 as described with respect to FIG. 4.

In this example, at 702, the tilt sensor state logic module 412 may determine a running mean of tilt values over a first distance traversed by the AMD 140. For example, a motor encoder 310 determines encoder data indicative of a rotation of a motor 142 and the autonomous navigation module 154 may use the encoder data to determine a distance traveled by the AMD 104. As another example, the tilt sensor state logic module 412 may use an operating speed of the AMD 104 based on an operating state 414 to determine the distance traveled by the AMD 104 over a given time period.

The tilt sensor 124 may measure tilt values at a first frequency, such as 100 measurements per second. In other examples, measurement frequency may be greater or less than 100 measurements per second. At a first time, the AMD 104 may be moving at a first speed that may be determined from a motor encoder 310 that is moving the AMD 104 at the first speed. The tilt sensor state logic module 412 may determine a running mean of tilt values over a first distance traveled by the AMD 104. In one implementation, the first distance is a length of a wheelbase of the AMD 104. The wheelbase may be a distance measured between the rear wheel or wheels and the front wheel or wheels of the AMD 104. In this example, for simplicity, the wheelbase may be 50 cm. In other examples, the wheelbase may be larger or smaller. In this example, if the AMD 104 is moving at 1.0 m/s, then it may take the AMD 104 0.5 seconds to traverse the first distance.

In this example, to determine a running mean of tilt values over the first distance, the tilt sensor state logic module 412 uses a tilt value indicated by data 406 and previous (S−1) tilt value measurements, where S=50. In other examples, if the AMD 104 is moving faster, then fewer tilt value measurements may be used, and if the AMD 104 is moving slower, then more tilt value measurements may be used. In general, the number of tilt value measurements used is based on a frequency of tilt measurements, a speed of the AMD 104, and a length of the wheelbase of the AMD 104. By using a first distance that is equal to or greater than the wheelbase of the AMD 104, the AMD 104 avoids changing speeds based on tilt values if the tilt values are indicative of a temporary obstacle, such as a threshold. However, for obstacles such as ramps that are longer than the wheelbase of the AMD 104, the running mean of the tilt value over the first distance may serve as a trigger to transition to a different state and associated speed based on the AMD 104 being on a ramp. Each of the S tilt measurements may be stored within memory 146 as the tilt sensor 124 determines tilt values.

In other implementations, at 702, the AMD 104 may determine a running mean of tilt values over a first number of tilt measurements. For example, if the first number of tilt measurements is X, then the X most recent tilt measurements may be stored within the memory 146. In this example, to determine a running mean of tilt values, the tilt sensor state logic module 412 may determine a mean of a tilt measurement indicated by data 406 and a previous (X−1) tilt measurements stored in memory 146. The first number of tilt measurements, X, may be based on reducing noise or inconsistencies in tilt value measurements. For example, if over X tilt values, the variance of the tilt measurements is less than a first threshold, then the first number of tilt measurements may be X or greater.

In other implementations, at 702, the AMD 104 may determine a running mean of tilt values over a first period of time. For example, if the first period of time is Y seconds, then each tilt measurement over the last Y seconds may be stored within the memory 146. In this example, if Y is 0.25 seconds, and the tilt sensor 124 measures tilt values at 100 Hz, then the more recent 25 tilt values are stored within the memory 146. In other examples, the value of Y may be larger or smaller.

At 704, the tilt sensor state logic module 412 may determine whether the running mean of tilt values is greater than a tilt threshold. In this example, the tilt threshold may be 4 degrees. In other examples, the tilt threshold may be larger or smaller. If the running mean of tilt values is greater than the tilt threshold, the process continues to 706. If the running mean of tilt values is less than or equal to the tilt threshold, the process continues to 708. In some examples, the tilt sensor state logic module 412 may determine additional states. For example, if the running mean of tilt values continues to increase as the AMD 104 moves along an up ramp or decrease as the AMD 104 moves along a down ramp, then the tilt sensor state logic module 412 may determine a stop state.

At 706, the operating state is determined to be a slow state, and the tilt sensor state logic module 412 determines state 414 to be the slow state. The state 420 is then used by the state-to-weight mapping module 422.

At 708, the operating state is determined to be a normal state, and the tilt sensor state logic module 412 determines state 420 to be the normal state. The state 420 is then used by the state-to-weight mapping module 422.

Figure 8:
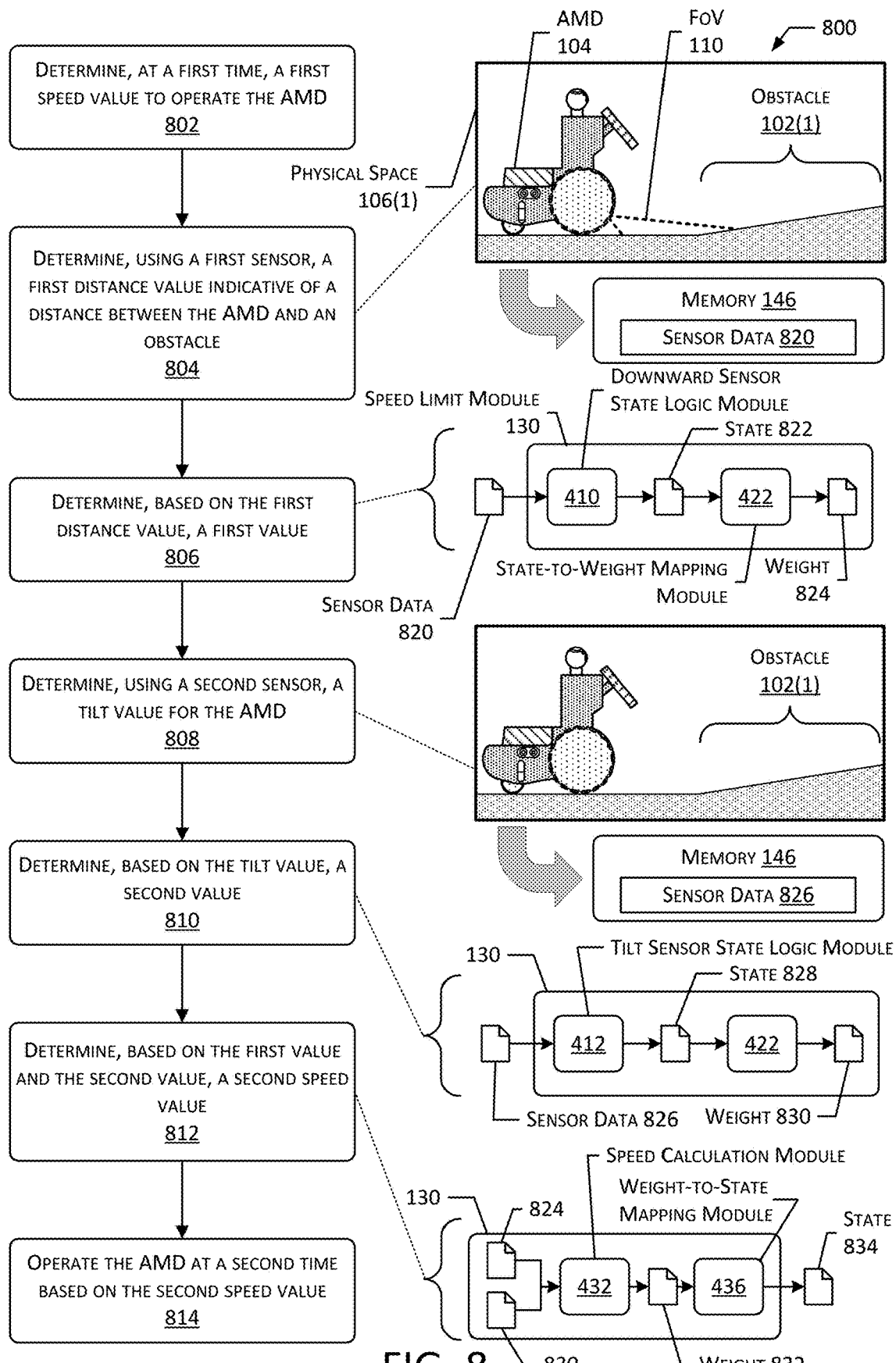
FIG. 8 is a flow diagram of a process to determine an operating speed for an AMD, according to some implementations.

FIG. 8 is a flow diagram 800 of a process to determine an operating speed for an AMD 104, according to some implementations.

The process to determine an operating speed for the AMD 104 is described above with respect to FIG. 4. In this example, the process has been simplified to use two types of sensors instead of three. The two types of sensors in this example are the downward sensors 122 and the tilt sensor 124.

At 802, at a first time, the speed limit module 130 may determine a first speed value to operate the AMD 104. In this example, the first time may be any given point in time during operation of the AMD 104, and serves as a reference associated with a given operating state and a first speed value associated with the operating state.

At 804, the AMD 104 may determine, using a first sensor, a first distance value indicative of a distance between the AMD 104 and an obstacle. The first sensor may be a downward sensor 122 with field of view 108. The obstacle 102(1) may be an up ramp within a physical space 106(1). The first distance value may be stored as sensor data 820 within memory 146.

At 806, the speed limit module 130 may determine, based on the first distance value, a first value. The first value may be weight 824 data determined by the state-to-weight mapping module 416. The downward sensor state logic module 410 may use the first distance value stored as sensor data 820 and determine a state 822. The determination of a state from a distance value is described in greater detail with respect to FIGS. 4 and 6.

At 808, the AMD 104 may determine, using a second sensor, a tilt value for the AMD 104. The second sensor may be a tilt sensor 124. The tilt value may be stored as sensor data 826 within memory 146.

At 810, the speed limit module 130 may determine, based on the tilt value, a second value. The second value may be weight 830 data determined by the state-to-weight mapping module 416. The tilt sensor state logic module 408 may use the tilt value stored as sensor data 826 and determine a state 828. The determination of a state 828 from a tilt value is described in greater detail above with respect to FIGS. 4 and 7.

At 812, the speed limit module 130 may determine, based on the first value and the second value, a second speed value. In this example, the first value is the weight 824 data based on the downward sensor 122 and the second value is the weight 830 data based on the tilt sensor 124. The second speed value may be a speed value within a range of speed values associated with state 834. Example speed values associated with different states are described above with respect to legend 518 of FIG. 5. The state 834 is determined by the weight-to-state mapping module 430. The weight-to-state mapping module 430 uses a weight 832 determined by the speed calculation module 426. The speed calculation module 426 uses weight values 824 and 830 to determine weight 832 data. The speed calculation module 426 is described in greater detail with respect to FIG. 4.

At 814, the motor control module 132 may operate the AMD 104 at a second time based on the second speed value.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
   a first sensor;
   a second sensor;
   one or more memories storing computer-executable instructions; and
   one or more processors to execute the computer-executable instructions to:
      determine, at a first time, a first speed value to operate the AMD;
      determine, using the first sensor, a first distance value indicative of a distance between the AMD and a first obstacle within a physical space;
      determine one or more distance thresholds associated with the first sensor;
      determine, using the first sensor, one or more brightness measurements;
      determine one or more brightness thresholds associated with the first sensor;
      determine, based at least in part on the first distance value, the one or more distance thresholds, the one or more brightness measurements, and the one or more brightness thresholds, a first value;
      determine, using the second sensor, a first tilt value indicative of a tilt of the AMD;
      determine, based at least in part on the first tilt value, a second value;
      determine, based on the first value and the second value, a second speed value that is less than the first speed value; and
      operate the AMD at a second time based on the second speed value.

2. The AMD of claim 1,
   wherein the first sensor comprises a time-of-flight sensor having a field of view that is directed forward and downward, and
   wherein the second sensor is an inertial measurement unit.

3. The AMD of claim 1, wherein to determine the second speed value, the one or more processors further execute the computer-executable instructions to:
   determine, over a first time period between the first time and the second time, one or more distance measurements using the first sensor;
   determine, based on the one or more distance measurements, a first characteristic of the physical space that is indicative of one of:
      an up ramp having a slope greater than a first threshold value,
      a down ramp having a slope less than a second threshold value, or
      a floor surface having a slope less than or equal to the first threshold value and greater than or equal to the second threshold value; and
   determine, based at least on the first characteristic, the second speed value.

4. The AMD of claim 1, wherein to determine the second speed value, the one or more processors further execute the computer-executable instructions to:
   operate the first sensor to emit a first wavelength of light;
   determine, over a first time period between the first time and the second time, one or more values, wherein the one or more values are indicative of an intensity of reflected light emitted by the first sensor;
   determine, based on the one or more values, that an albedo of a floor is less than a first threshold value; and
   determine, based at least on the albedo of the floor being less than the first threshold value, the second speed value.

5. The AMD of claim 1, wherein to determine the second speed value, the one or more processors further execute the computer-executable instructions to:
   determine, using the second sensor over a first time period between the first time and the second time, one or more sensor measurements that are determined as the AMD traverses a distance greater than or equal to a length of a wheelbase of the AMD;
   determine, based on the one or more sensor measurements, a mean of tilt values of the AMD; and
   determine, based at least on the mean of tilt values, the second speed value.

6. The AMD of claim 1, further comprising a third sensor comprising a time-of-flight sensor having a field of view that is directed forward, and wherein to determine the second speed value, the one or more processors further execute the computer-executable instructions to:
   determine, over a first time period between the first time and the second time, one or more distance measurements using the third sensor;
   determine, based on the one or more distance measurements, that a distance between the AMD and the first obstacle is less than a first threshold value; and
   determine, based at least on the distance between the AMD and the first obstacle being less than the first threshold value, the second speed value.

7. The AMD of claim 1, further comprising a third sensor comprising a time-of-flight sensor having a field of view that is directed forward, and wherein to determine the second speed value, the one or more processors further execute the computer-executable instructions to:
   operate the third sensor to emit a first wavelength of light;
   determine, over a first time period between the first time and the second time, one or more values, wherein the one or more values are indicative of an intensity of reflected light emitted by the third sensor;
   determine, based on the one or more values, a first characteristic indicative of one of:
      a third value being greater than a first threshold value, or
      a fourth value being less than or equal to the first threshold value and greater than a second threshold value; and
   determine, based at least on the first characteristic, the second speed value.

8. The AMD of claim 1, further comprising a third sensor comprising a time-of-flight sensor having a field of view this is directed forward, and wherein to determine the second speed value, the one or more processors further execute the computer-executable instructions to:
   over a first time period between the first time and the second time:
      determine, using the first sensor, a first one or more distance measurements;
      determine, using the first sensor, a first one or more values indicative of an intensity of reflected light emitted by the first sensor;
      determine, using the second sensor, one or more tilt values;
      determine, using the third sensor, a second one or more distance measurements;
      determine, using the third sensor, a second one or more values indicative of an intensity of reflected light emitted by the third sensor;
   determine a third value based on the first one or more distance measurements;
   determine a fourth value based on the first one or more values;
   determine a fifth value based on the one or more tilt values;
   determine a sixth value based on the second one or more distance measurements;
   determine a seventh value based on the second one or more values;
   determine a minimum speed value associated with a lowest value among the third value, the fourth value, the fifth value, the sixth value, and the seventh value; and
   determine, based on the minimum speed value, the second speed value.

9. The AMD of claim 1, wherein the one or more processors further execute the computer-executable instructions to:
   determine, using the first sensor, a second distance value between the AMD and a second obstacle within the physical space, wherein the second distance value is greater than the first distance value;
   determine, using the second sensor, a second tilt value of the AMD;
   determine a third value indicative of a difference between the first tilt value and the second tilt value; and
   determine, based on the third value and on the second distance value, a third distance value associated with a distance between the AMD and the first obstacle that compensates for the second tilt value.

10. The AMD of claim 1, wherein the one or more processors further execute the computer-executable instructions to:
    determine, using the first sensor, a second distance value between the AMD and a second obstacle within the physical space;
    determine, using the second sensor, a second tilt value of the AMD;
    determine a first difference value indicative of a difference between the first tilt value and the second tilt value;
    determine that the first difference value is less than a first threshold value;
    determine a second difference value indicative of a difference between the first distance value and the second distance value;
    determine that the second difference value is greater than a second threshold value; and
    determine, based on the first difference value being less than the first threshold value and on the second difference value being greater than the second threshold value, a change in slope of a floor surface in front of the AMD, wherein the change in slope indicates a downward slope.

11. The AMD of claim 10, wherein the one or more processors further execute the computer-executable instructions to:
    determine, based on the change in slope indicating a downward slope, a third speed value that is less than the second speed value; and
    move, based on the third speed value, the AMD.

12. The AMD of claim 1, wherein to determine the second speed value, the one or more processors further execute the computer-executable instructions to:
    determine, using the first sensor, a crosstalk value, wherein the crosstalk value is indicative of signal noise from light emitted by the first sensor;
    determine that the crosstalk value is greater than a crosstalk threshold; and determine, based on the crosstalk value being greater than the crosstalk threshold, the second speed value.

13. A method comprising:
   determining, at a first time, a first speed value to operate an autonomous mobile device (AMD);
   determining, using a first sensor, a first distance value indicative of a distance between the AMD and a first obstacle within a physical space;
   determining, based at least on the first distance value, a first state associated with the AMD;
   determining a first mapping between the first state and a first weight associated with the first sensor;
   determining, using a second sensor, a first tilt value indicative of a tilt of the AMD;
   determining, based at least on the first tilt value, a second state associated with the AMD;
   determining a second mapping between the second state and a second weight associated with the second sensor;
   determining, based on the first state, the first mapping, the second state, and the second mapping, a second speed value that is less than the first speed value; and
   operating the AMD at a second time based on the second speed value.

14. The method of claim 13, wherein the determining the second speed value further comprises:
   determining, over a first time period between the first time and the second time, one or more distance measurements using the first sensor;
   determining, based on the one or more distance measurements, a first characteristic of the physical space that is indicative of one of:
      an up ramp having a slope greater than a first threshold value,
      a down ramp having a slope less than a second threshold value, or
      a floor surface having a slope less than or equal to the first threshold value and greater than or equal to the second threshold value; and
   determining, based at least on the first characteristic, the second speed value.

15. The method of claim 13, wherein the determining the second speed value further comprises:
   operating the first sensor to emit a first wavelength of light;
   determining, over a first time period between the first time and the second time, one or more values, wherein the one or more values are indicative of an intensity of reflected light emitted by the first sensor;
   determining, based on the one or more values, that an albedo of a floor is less than a first threshold value; and
   determining, based at least on the albedo of the floor being less than the first threshold value, the second speed value.

16. The method of claim 13, wherein the determining the second speed value further comprises:
   determining, over a first time period between the first time and the second time, one or more sensor measurements using the second sensor;
   determining, based on the one or more sensor measurements, a running mean of tilt values of the AMD; and
   determining, based at least on the running mean of tilt values, the second speed value.

17. The method of claim 13, further comprising:
   determining, using the first sensor, a second distance value between the AMD and a second obstacle within the physical space, wherein the second distance value is greater than the first distance value;
   determining, using the second sensor, a second tilt value of the AMD;
   determining a first value indicative of a difference between the first tilt value and the second tilt value; and
   determining, based on the first value and on the second distance value, a third distance value associated with a distance between the AMD and the first obstacle that compensates for the second tilt value.

18. A system comprising:
   a first sensor;
   a second sensor;
   one or more memories storing computer-executable instructions; and
   one or more processors to execute the computer-executable instructions to:
      determine, at a first time, a first speed value to operate an autonomous mobile device (AMD);
      determine, using the first sensor, a first distance value indicative of a distance between the AMD and a first obstacle within a physical space;
      determine, using the first sensor, a first characteristic of the physical space that is indicative of an up ramp having a slope greater than a first threshold value;
      determine, using the second sensor, a first tilt value indicative of a tilt of the AMD;
      determine, based at least on the first distance value, the first characteristic, and the first tilt value, a second speed value that is less than the first speed value; and
      operate the AMD at a second time based on the second speed value.

19. The system of claim 18,
   wherein the first sensor comprises a time-of-flight sensor having a field of view that is directed forward and downward, and
   wherein the second sensor is an accelerometer.

20. The system of claim 18, wherein to determine the second speed value, the one or more processors further execute the computer-executable instructions to:
   determine, over a first time period that includes the first time and the second time, one or more distance measurements using the first sensor;
   wherein the first characteristic of the physical space that is indicative of the up ramp is based on the one or more distance measurements.

* * * * *

UNITED STATES PATENT AND TRADEMARK OFFICE
CERTIFICATE OF CORRECTION

| | | |
|---|---|---|
| PATENT NO. | : 11,989,026 B1 | Page 1 of 1 |
| APPLICATION NO. | : 17/303044 | |
| DATED | : May 21, 2024 | |
| INVENTOR(S) | : Chen Wang et al. | |

It is certified that error appears in the above-identified patent and that said Letters Patent is hereby corrected as shown below:

In the Claims

Column 37, Claim 8, Line 10:
Currently reads: "sensor having a field of view this"
Where it should read: --sensor having a field of view that--

Signed and Sealed this
Eighteenth Day of June, 2024

Katherine Kelly Vidal
*Director of the United States Patent and Trademark Office*